US008788118B2

(12) United States Patent
Matos

(10) Patent No.: US 8,788,118 B2
(45) Date of Patent: Jul. 22, 2014

(54) SYSTEMS AND METHODS FOR DETECTING AND MANAGING THE UNAUTHORIZED USE OF AN UNMANNED AIRCRAFT

(76) Inventor: Jeffrey A. Matos, New Rochelle, NY (US)

( * ) Notice: Subject to any disclaimer, the term of this patent is extended or adjusted under 35 U.S.C. 154(b) by 440 days.

(21) Appl. No.: 13/195,268

(22) Filed: Aug. 1, 2011

(65) Prior Publication Data

US 2012/0022719 A1    Jan. 26, 2012

Related U.S. Application Data

(63) Continuation-in-part of application No. 12/946,254, filed on Nov. 15, 2010, now Pat. No. 7,991,517, which is a continuation of application No. 11/899,827, filed on Sep. 6, 2007, now Pat. No. 7,835,824.

(60) Provisional application No. 60/842,600, filed on Sep. 6, 2006.

(51) Int. Cl.
*G05D 1/00* (2006.01)
*B64C 39/02* (2006.01)

(52) U.S. Cl.
CPC ........ *G05D 1/0022* (2013.01); *B64C 2201/146* (2013.01); *B64C 39/024* (2013.01); *G08C 2201/61* (2013.01)

USPC .............................................. 701/2

(58) Field of Classification Search
USPC .............................................. 701/2
See application file for complete search history.

(56) References Cited

U.S. PATENT DOCUMENTS

| 6,965,816 B2 * | 11/2005 | Walker ........................... 701/16 |
| 7,323,970 B1 * | 1/2008 | Murray et al. ........... 340/426.12 |
| 7,598,846 B2 * | 10/2009 | Griffin et al. ............ 340/426.11 |
| 2004/0156327 A1 * | 8/2004 | Yankielun et al. ............ 370/310 |
| 2006/0250578 A1 * | 11/2006 | Pohl et al. ...................... 351/210 |
| 2007/0288127 A1 * | 12/2007 | Haq et al. .......................... 701/2 |
| 2010/0222939 A1 * | 9/2010 | Namburu et al. ................. 701/2 |

* cited by examiner

*Primary Examiner* — Shelley Chen

(57) ABSTRACT

A method for policing and managing the operation of a flying, unmanned aircraft in the event of usurpation of control of, malfunction of, or ill-intentioned use of, this aircraft includes the steps of (a) detecting inappropriate operation of the aircraft; (b) transmitting a takeover command to the aircraft to interrupt control of the operation of this aircraft by a first pilot and relinquish control of the aircraft to a second pilot; and (c) transmitting control commands to the aircraft to control its operation by the second pilot, until the need for alternate pilot control of the aircraft has ended or until the aircraft has landed safely.

50 Claims, 15 Drawing Sheets

SYSTEMS AND METHODS FOR DETECTING AND MANAGING THE UNAUTHORIZED USE OF AN UNMANNED AIRCRAFT

CROSS-REFERENCE TO RELATED APPLICATIONS

This application is a continuation-in-part of U.S. patent application Ser. No. 12/946,254, filed Nov. 15, 2010 (now U.S. Pat. No. 7,991,517), which, in turn, was a continuation of U.S. patent application Ser. No. 11/899,827, filed Sep. 6, 2007 (now U.S. Pat. No. 7,835,824).

This application claims priority from provisional application No. 60/842,600 filed Sep. 6, 2006; U.S. patent application Ser. No. 11/899,827, filed Sep. 6, 2007 (now U.S. Pat. No. 7,835,824), issued Nov. 16, 2010; U.S. patent application Ser. No. 12/157,469, filed Jun. 11, 2008 (now U.S. Pat. No. 8,233,672); and U.S. patent application Ser. No. 12/946,254, filed Nov. 15, 2010 (now U.S. Pat. No. 7,991,517). This application also incorporates by reference U.S. Pat. No. 6,917,863 and the subject matter of each of the U.S. patent application Ser. Nos. 10/919,169 (now U.S. Pat. No. 7,840,317), 11/373,712 (now U.S. Pat. No. 7,837,143), 11/385,270 (now U.S. Pat. No. 7,350,748), 11/388,311 (now U.S. Pat. No. 8,164,464) and 12/157,469 (now U.S. Pat. No. 8,233,672).

BACKGROUND OF THE INVENTION

The present invention concerns a method and apparatus for "policing" unmanned aircraft, such as "unmanned aerial vehicles" (UAs) and "unmanned aerial systems" (UASs). The invention is specifically directed to the problems posed by (1) a usurpation of control of an unmanned aircraft by an unauthorized third party, (2) the operation of a malfunctioning unmanned aircraft, and/or (3) the ill-intentioned use of an unmanned aircraft thus posing a danger to person and/or property.

SUMMARY OF THE INVENTION

The systems and methods described herein are intended to prevent the use of unmanned aircraft, e.g. UAs and UASs, hereinbelow "UA", for unauthorized and possibly ill-intentioned purposes.

The approaches to such prevention, set forth in applicant's parent application Ser. Nos. 12/946,254, filed Nov. 15, 2010, and U.S. patent application Ser. No. 11/899,827, include:
A) Approach #1: Failure to provide a unique identification or password on request makes the UA subject to destruction.
This approach requires:
 1) that all UA have a unique identification, "UI", consisting of digits, numbers, both or any reproducible information carrying identifier; and
 2) that such identification is either permanently unalterable, or alterable only by an authorized person or entity; and
 3) that such identification must be able to be presented at any time that an authorized person or entity requests;
The UI may be either:
 1) supplied to the UA at the time of aircraft manufacture, or some later time substantially prior to takeoff;
 2) supplied to the UA immediately prior to takeoff. Such pre-takeoff UI supply approaches parallel the encryption key supply approaches described in U.S. Pat. No. 6,917,863, and include generation of the UI:
  a) onboard the UA;
  b) from a remote control center "RCC"; or
  c) from a freestanding UI generation device; or 3) both: In this case the UI is supplied at some early instance and a password, "PW", is supplied immediately prior to takeoff. The password may have the same three possible sources as the UI.

A request for UI or PW presentation may be made at the time of takeoff, or at any time during a UA flight. If there is either no response or an incorrect response, corrective actions include:
 1) dispatch an interceptor aircraft, "IAC", which may:
  a) further/better identify the UA; and/or
  b) determine that the UA flight should be terminated.
  If flight termination is selected, IAC options include:
   a) disable or shoot down the UA using a weapon system aboard the IAC; or
   b) activate a self-destruct system—if included in the UA design [discussed hereinbelow]; and
 2) activate a self-destruct system—if included—from the RCC.
B) Approach #2: Failure to comply with a pre-registered flight plan makes the UA subject to destruction.
In this approach, the UA is required to file a flight plan prior to takeoff. If the flight plan is unacceptable, takeoff is unauthorized, and any of the means for aircraft destruction or incapacitation discussed hereinabove and hereinbelow may be enacted.

Methods of monitoring compliance with the flight plan during flight include:
 1) Equipment onboard the UA, continually compares the UA position as derived from GPS data or other aircraft locating means as is known in the art, (and the UA velocity vector) with the expected one, based on the flight plan. Any significant deviation from the flight plan is thus detected by onboard equipment and transmitted to an authority at a RCC, who has the options of further observation, investigation or action as described hereinabove;
 2) The UA reports only a continuous, semi-continuous or intermittent stream of GPS data (or reports it on request). Personnel within the RCC then compare such data with either:
  a) the previously filed flight plan;
  b) known no-fly zones; or
  c) both a) and b).
 If the position or track of the UA is deemed unsatisfactory, RCC authority options are as stated above.
 3) Visual or radar sightings of the UA are compared with either:
  a) the previously filed flight plan;
  b) known no-fly zones; or
  c) both a) and b).
 If the position or track of the UA is deemed unsatisfactory, RCC authority options are as stated above. The sighting information is obtained by any of the following "monitoring means":
  a) other aircraft, including:
   i) passenger, commercial or military aircraft who site the UA incidentally;
   ii) other UA, which are in place to police UA (and other) air traffic;
   iii) an IAC, if dispatched; and
  b) terrestrial stations, including RCCs and air traffic control installations;
Furthermore, the UA may carry a locator beacon which assists tracking of it and serves a purpose similar to that of visual/radar sightings.

In a preferred embodiment of the invention, Approach #2 is carried out with a UA with a UI (with or without a PW). (If the UA transmits its location and/or transmits deviations from flight plan, the transmission is meaningless without a UI.) Obviously, remotely controlled destruction requires a UI.

In an alternate embodiment of the invention, an aircraft which does not have a UI, which is detected by any of the aforementioned monitoring means may be requested to present a flight plan. Such request may be transmitted to it by 1) an IAC in close proximity, on a recognized/commonly agreed upon frequency allocation; or 2) a non-local RCC, on such a frequency allocation, in which case coordinates with sufficient precision to identify the UA in question would be used as the identifier.

Failure to comply with the request for flight plan would result in either:

1) destruction of the UA; or
2) escort of the UA by the IAC until such time as:
a) the UA is no longer deemed to be a threat; or
b) a decision is made to destroy the UA.

C) Approach #3: Each UA is required to allow itself to be controlled by an alternate pilot, upon the request of the alternate pilot. The alternate pilot, representing a known/safe/recognized/responsible authority can:

1) test whether the UA has such capability; and
2) if necessary, assume control of the UA.

This approach allows policing of UAs by adding the option of alternate pilot, "Alt-P", control. The alternate pilot controls the UA by any means of information exchange as is known in the art including radiofrequency, optical, and infrared means.

The Alt-P first determines whether the aircraft is controllable by the Alt-P. This may be determined in one or more of the following ways:

1) The Alt-P may interrogate the UA and determine from it's UI whether the UA is controllable. To do this, the Alt-P may access a database containing the UIs of known controllable UAs.

2) The Alt-P may send a test signal on a frequency and with modulation and coding format known to be used for UAs. If the UA is a controllable one, the UA sends back a confirmation signal indicating that it is controllable.

3) The Alt-P may send a test control signal on a frequency and with modulation and coding format known to be used for UAs. The test control signal includes a flight control command which results in a test motion (e.g. momentarily roll five degrees one way and then momentarily roll five degrees the other way and then return to previous course). The Alt-P confirms that the desired result has occurred by either:

a) visual inspection, if the Alt-P is in the near vicinity of the UA; or
b) a telemetry signal from the UA, originating from sensors within the UA.

Test control signals may control pitch, yaw, throttles, etc.

If the Alt-P deems necessary, the Alt-P may take control of the UA and fly it to an appropriate destination.

If the Alt-P determines that the UA has been modified (e.g. post production, or even post take-off) so that the Alt-P cannot fly the UA in a way that was allowed for in the initial specifications, the Alt-P may take action to cause the destruction of the UA. (If not in visual range of the UW the Alt-P can make such a determination with a UA that has a UI.) If the UA was not designed to be controllable by an Alt-P, the Alt-P will then decide (based on existing regulations concerning controllability of a UA, and based on the actions of the particular UA) whether to allow the current UA flight to continue.

The Alt-P may be located within the vicinity of the UA, or at a greater distance. In parallel to the discussions of remote aircraft control in U.S. Pat. No. 6,917,863 and in U.S. patent application Ser. Nos. 10/919,169 and 11/373,712, the advantage of limiting Alt-P actions to local Alt-Ps is the security means available to a short range communications link (i.e. using methods such as a high output controller transmitter and a low sensitivity UA receiver, and using highly directional transmission/reception means). A short range communications link is therefore much less likely to be accessed by an unauthorized person than is a long range link. The advantage of using a long range link is that it can be accessed immediately, upon the detection of a suspicious UA; the delays implicit in 1) sending an IAC; and
2) awaiting its arrival at the vicinity of the UA are not encountered.

UAs which allow Alt-P systems give the UA policing community another option beyond either:

1) further observe the UA; or
2) destroy the UA.

Alt-P systems may be used with or without UI/PW systems and with or without systems which compare aircraft position and velocity vectors with those called for by the flight plan.

The aforementioned system functions are enabled/facilitated and rendered more secure/robust by sub-systems including:

tamper detecting seals;
write-once-only-memory (e.g. so called PROMs (programmable read-only memories), EPROMs, EEPROMs, etc. as are known in the art, and as are, hereinbelow referred to as "XPROMs");
encryption/encoding circuits and techniques;
destructive means aboard the UA.

These are further discussed hereinbelow.

As a further extension and elaboration of the features of the present invention, in addition to those described above and set forth in the patent application Ser. Nos. 12/946,254 and 11/899,827, the following novel apparatus and methods are proposed and described hereinbelow.

1. An unmanned vehicle system, which is remotely controllable from each of a first remote control unit and a second remote control unit, comprising:

(A) an unmanned vehicle comprising:

(a) a vehicle receiving device, for receiving instruction signals from each of said remote control units;

(b) a vehicle processor, coupled to said at least one receiving device, for
receiving instructions specified by said instruction signals,
in response to a police control instruction received exclusively from said second remote control unit, selecting the source of said instructions from among said first and said second remote control units; and
producing operational control signals for the vehicle in response to selected instructions, (c) at least one actuator, coupled to said processor, responsive to said operational control signals, for actuating at least one of:

(1) at least one device for controlling an orientation of said vehicle, and
(2) at least one device for controlling at least one of (i) a velocity, and (ii) an acceleration, of said vehicle;

(d) at least one sensing device, coupled to said vehicle processor, for sensing vehicle data and supplying signals to said vehicle processor representing said sensed vehicle data; and (e) a vehicle transmitting device, coupled to said vehicle processor, for transmitting signals representing said sensed vehicle data;

(B) a first remote control unit for providing first instructions, said first unit comprising:
(a) a first transmitting device;
(b) a first receiving device, for receiving signals from said vehicle transmitting device;
(c) a first input device for manually inputting first instructions;
(d) a first display device for displaying information; and
(e) a first processor, coupled to said first transmitting device, said first receiving device, said first input device, and said first display device, for
processing and supplying signals representing said first instructions to said first transmitting device, and for
processing and supplying signals received by said first receiving device to said first display device; and
(C) a second remote control unit for providing second instructions and a police control instruction, said second unit comprising:
(a) a second transmitting device;
(b) a second receiving device, for receiving signals from each of said vehicle transmitting device and from said first transmitting device;
(c) a second input device for manually inputting second instructions and a police control instruction;
(d) a second display device for displaying information; and
(e) a second processor, coupled to said second transmitting device, said second receiving device, said second input device, and said second display device, for
processing and supplying signals representing said second instructions and said police control instruction to said second transmitting device and for
processing and supplying signals received by said second receiving device to said second display device.
wherein:
(i) in a first operating state, said vehicle processor is operative to produce said operational control signals in response to said first instructions transmitted directly from said first transmitting device to said vehicle receiving device;
(ii) in a second operating state,
(I) said vehicle processor is operative to produce said operational control signals in response to said second instructions from said second remote control unit; and
(II) said vehicle processor is operative to be unresponsive to said first instructions;
(iii) in a third operating state,
(I) said second receiving device is operative to receive said first instructions from said first remote control unit;
(II) said second processor is operative to cause said second transmitting device to transmit a respective second instruction representing each received first instruction;
(III) said vehicle processor is operative to produce said operational control signals in response to said respective second instruction; and
(IV) said vehicle processor is operative to be unresponsive to said first instruction;
(iv) said vehicle processor is operative, in response to said police control instruction from said second remote control unit, to select one of a first, second and third operating state;
thereby
to determine which of said first remote control unit and said second remote control unit controls the operation of the vehicle;
to determine, in the case of said first remote control unit controlling the operation of said vehicle, whether control is:
by signals transmitted directly from said first remote control unit to said vehicle, or
by signals transmitted from said first remote control unit to said second remote control unit and thence to said vehicle; and
to facilitate the interruption of vehicle control by said first remote control unit during said third operating state, in the event of improper operation of said vehicle by said first remote control unit.

2. The system described above, wherein said unmanned vehicle is selected from the group consisting of:
(A) an unmanned aerial vehicle,
(B) an unmanned ground vehicle,
(C) an unmanned underwater vehicle, and
(D) an unmanned space vehicle.

3. The system described above, wherein said vehicle data is selected from the group consisting of:
(A) an altitude,
(B) a latitude,
(C) a longitude,
(D) GPS coordinates,
(E) a velocity,
(F) a rate of climb,
(G) a rate of descent,
(H) a horizontal acceleration,
(I) a vertical acceleration,
(J) an attitude,
(K) a pitch,
(L) a yaw,
(M) a rate of roll,
(N) a rate of change of pitch,
(O) a rate of change of yaw,
(P) a remaining fuel amount in the vehicle,
(Q) a battery voltage,
(R) a battery current,
(S) an oil pressure,
(T) an inside vehicle temperature,
(U) an outside vehicle temperature,
(V) a depth,
(W) a pressure on a surface of the vehicle,
(X) a tire pressure,
(Y) an engine speed, and
(Z) the position of a movable surface of the vehicle.

4. The system described above, wherein said vehicle transmitting device and said second receiving device maintain secure communications utilizing apparatus for at least one of:
(A) encoding and decoding,
(B) encryption and decryption,
(C) changing communication frequency,
(D) highly directional transmission,
(E) a low power output vehicle transmitting device and a high sensitivity second receiving device, and
(F) communicating over a secure channel.

5. The system described above, wherein said first transmitting device and said vehicle receiving device maintain secure communications utilizing apparatus for at least one of:
(A) encoding and decoding,
(B) encryption and decryption,
(C) changing communication frequency,
(D) highly directional transmission,
(E) a low power output first transmitting device and a high sensitivity vehicle receiving device, and
(F) communicating over a secure channel.

6. The system described above, wherein said second transmitting device and said vehicle receiving device maintain secure communications utilizing apparatus for at least one of:
   (A) encoding and decoding,
   (B) encryption and decryption,
   (C) changing communication frequency,
   (D) highly directional transmission,
   (E) a low power output second transmitting device and a high sensitivity vehicle receiving device, and
   (F) communicating over a secure channel.

7. The system described above, wherein, in said first operating state, said vehicle data is transmitted to one of:
   (A) said first remote control unit, and
   (B) both said first and said second remote control units.

8. The system described above, wherein, in said second operating state, said vehicle data is not transmitted to said first remote control unit.

9. The system described above, wherein, in said third operating state:
   in a first operating mode, said vehicle data is transmitted to both said first and said second remote control units.

10. The system described above, wherein, in said third operating state:
    in a second operating mode, said vehicle data is transmitted:
    (i) directly to said second remote control unit; and
    (ii) indirectly to said first remote control unit via said second remote control unit;
    thereby to facilitate the interruption of vehicle control by said first remote control unit by the interruption of the relay function of the second remote control unit.

11. The system described above, wherein said at least one sensing device includes a device for determining a location of said vehicle utilizing a global positioning system and wherein said second processor is further operative to automatically generate a police control instruction causing said vehicle processor to enter one of:
    (A) said second operating state, and
    (B) said third operating state,
    when said global positioning system indicates an inappropriate location of said vehicle.

12. The system described above, wherein
    (A) at least one of said at least one sensing devices senses at least one parameter having a range of values for which acceptable performance for said vehicle has been defined, and
    (B) said second processor is further operative to automatically generate a police control instruction causing said vehicle processor to enter one of:
    (i) said second operating state, and
    (ii) said third operating state,
    when said second processor detects a value of said at least one parameter which is outside said range of values.

13. The system described above, wherein said second processor is further operative to automatically generate a police control instruction causing said vehicle processor to enter one of:
    (i) said second operating state, and
    (ii) said third operating state,
    when at least one of the following is detected by said second processor:
    (1) a low value of altitude in certain specific locations,
    (2) a low velocity in certain specific locations,
    (3) a high velocity, and
    (4) a high rate of descent.

14. The system described above, wherein
    (A) said first remote control unit further comprises an identification input device, coupled to said first processor, for inputting biologic identification information of a person inputting instructions to said first input device;
    (B) said second remote control unit further comprises a memory device, coupled to said second processor for storing and providing access to biologic identification information pertaining to persons authorized to use said first remote control unit;
    (C) said second processor is further operative to store and to access said information in said memory;
    (D) said second display device is further operative to display representations of said biologic identification information pertaining to at least one of:
    (i) said authorized persons, and
    (ii) said inputting person;
    (E) said first processor is further operative to cause said first transmitting device to transmit a biologic signal representing said biologic identification information of said inputting person;
    (F) said second receiving device is further operative to receive said biologic signal;
    whereby a police person observing said second display device compares the representation of (1) the biologic identification information of said person inputting instructions to said first input device with (2) said stored biologic identification of said authorized persons, to determine whether said inputting person is one of said authorized persons.

15. The system described above, wherein
    (A) said first remote control unit further comprises an identification input device, coupled to said first processor, for inputting biologic identification information of a person inputting instructions to said first input device;
    (B) said second remote control unit further comprises a memory device, coupled to said second processor for storing and providing access to biologic identification information pertaining to persons authorized to use said first remote control unit;
    (C) said second processor is further operative to store and to access said information in said memory;
    (D) said first processor further is operative to cause said first transmitting device to transmit a biologic signal representing said biologic identification information of said inputting person;
    (F) said second receiving device is further operative to receive said biologic signal;
    (G) said second processor is further operative to compare
      (i) said stored biologic identification information pertaining to said authorized persons, with
      (ii) said received biologic identification information pertaining to said inputting person;
    and to analyze said information to determine if said stored and said received biologic information are substantially similar; and
    (G) said second processor is operative to provide a representation of at least one of (i) said analysis and (ii) said determination to said second display device.

16. An unmanned vehicle system, which is remotely controllable from each of a first remote control unit and a second remote control unit, comprising:
    (A) a vehicle comprising:
      (a) a vehicle receiving device, for receiving first instruction signals from a first remote control unit;
      (b) a vehicle processor, coupled to said vehicle receiving device, for
        receiving instructions specified by said first instruction signals, and producing operational control signals for the vehicle in response to said instructions;

(c) at least one actuator, coupled to said processor, responsive to said operational control signals, for actuating at least one of:
(1) at least one device for controlling an orientation of said vehicle, and
(2) at least one device for controlling at least one of (i) a velocity, and (ii) an acceleration, of said vehicle;

(d) at least one sensing device, coupled to said vehicle processor, for sensing vehicle data and supplying signals to said vehicle processor representing said sensed vehicle data; and (e) an vehicle transmitting device, coupled to said vehicle processor, for transmitting said signals representing said sensed vehicle data;

(B) a first remote control unit for providing said first instruction signals and for responding to a plurality of police control instructions, said first unit comprising:
(a) a first transmitting device, for transmitting said first instruction signals to said vehicle receiving device;
(b) a first receiving device;
(c) a first input device for manually inputting first instructions and police control instructions;
(d) a first display device for displaying information; and
(e) a first processor, coupled to each of said first transmitting device, said first receiving device, said first input device, and said first display device, for
processing signals representing said first instructions and supplying said signals to said first transmitting device,
processing signals representing said police control instructions, and
processing signals representing said sensed vehicle data received by said first receiving device and supplying said signals to said first display device;

(C) a second remote control unit for providing second instruction signals, said second unit comprising:
(a) a second transmitting device, for transmitting signals to said first receiving device;
(b) a second receiving device, for receiving signals from said first transmitting device;
(c) a second input device for manually inputting second instructions;
(d) a second display device for displaying information; and
(e) a second processor, coupled to each of said second transmitting device, said second receiving device, said second input device, and said second display device, for
processing said signals representing said second instructions and supplying said signals to said second transmitting device, and
processing signals representing said sensed vehicle data received by said second receiving device and supplying said signals to said second display device; and
wherein
(I) said first processor is further operative to supply said signals representing said sensed vehicle data to said first transmitting device, and to cause said transmitting device to transmit said signals to said second remote control unit;
(II) in response to a first police control instruction, said first processor is operative to generate first instruction signals representing the respective second instruction of each received second instruction signal and to cause said first transmitting device to transmit said signals to said vehicle receiving device;
(III) in response to a second police control instruction, said first processor is operative to prevent the transmission of instructions from said second remote control unit to said vehicle receiving device;
whereby
said first police control instruction causes second instructions from said second remote control device to control said vehicle;
said second police control instruction prevents second instructions from said second remote control device from controlling said vehicle; and
said police control instructions do not prevent said first instructions controlling said vehicle;
thereby
to facilitate the interruption of vehicle control by said second source of control, if necessary, while allowing ongoing vehicle control by said first source of control.

17. The system described above, wherein said unmanned vehicle is selected from the group consisting of:
(A) an unmanned aerial vehicle,
(B) an unmanned ground vehicle,
(C) an unmanned underwater vehicle, and
(D) an unmanned space vehicle.

18. The system described above, wherein said sensed vehicle data is selected from the group consisting of:
(A) an altitude,
(B) a latitude,
(C) a longitude,
(D) GPS coordinates,
(E) a velocity,
(F) a rate of climb,
(G) a rate of descent,
(H) a horizontal acceleration,
(I) a vertical acceleration,
(J) an attitude,
(K) a pitch,
(L) a yaw,
(M) a rate of roll,
(N) a rate of change of pitch,
(O) a rate of change of yaw,
(P) a remaining fuel amount in the vehicle,
(Q) a battery voltage,
(R) a battery current,
(S) an oil pressure,
(T) an inside vehicle temperature,
(U) an outside vehicle temperature,
(V) a depth,
(W) a pressure on a surface of the vehicle,
(X) a tire pressure,
(Y) an engine speed, and
(Z) the position of a movable surface of the vehicle.

19. The system described above, wherein said vehicle transmitting device and said first receiving device maintain secure communications utilizing apparatus for at least one of:
(A) encoding and decoding,
(B) encryption and decryption,
(C) changing communication frequency,
(D) highly directional transmission,
(E) a low power output vehicle transmitting device and a high sensitivity first receiving device, and
(F) communicating over a secure channel.

20. The system described above, wherein said first transmitting device and said vehicle receiving device maintain secure communications utilizing apparatus for at least one of:
   (A) encoding and decoding,
   (B) encryption and decryption,
   (C) changing communication frequency,
   (D) utilizing highly directional transmission,
   (E) utilizing a low power output first transmitting device and a high sensitivity vehicle receiving device, and
   (F) communicating over a secure channel.
21. The system described above, wherein said at least one sensing device includes a device for determining a location of said vehicle utilizing a global positioning system and wherein said first processor is further operative to automatically generate said second police control instruction when said global positioning system indicates an inappropriate location of said vehicle.
22. The system described above, wherein
   (A) at least one of said at least one sensing devices senses at least one parameter,
   (B) a range of values of said at least one parameter acceptable for said vehicle performance has been defined, and
   (C) said first processor is further operative to automatically generate said second police control instruction when said first processor detects a parameter value which is outside said range of values.
23. The system described above, wherein said first processor is further operative to automatically generate said second police control instruction when at least one of the following is detected by said first processor:
   (1) a low value of altitude in certain specific locations,
   (2) a low velocity in certain specific locations,
   (3) a high velocity, and
   (4) a high rate of descent.
24. The system described above, wherein
   (A) said second remote control unit further comprises an identification input device, coupled to said second processor, for inputting biologic identification information of a person inputting instructions to said second input device;
   (B) said first remote control unit further comprises a memory device, coupled to said first processor for storing and providing access to biologic identification information pertaining to persons authorized to use said second remote control unit;
   (C) said first processor is further operative to store and to access said information in said memory;
   (D) said first display device is further operative to display representations of said biologic identification information pertaining to at least one of:
      (i) said authorized persons, and
      (ii) said inputting person;
   (E) said second processor is further operative to cause said second transmitting device to transmit a biologic signal representing said biologic identification information of said inputting person;
   (F) said first receiving device is further operative to receive said biologic signal;
whereby a police person observing said first display device compares the representation of (1) the biologic identification information of said person inputting instructions to said first input device with (2) said stored biologic identification of said authorized persons, to determine whether said inputting person is one of said authorized persons.
25. The system described above, wherein
   (A) said second remote control unit further comprises an identification input device, coupled to said second processor, for inputting biologic identification information of a person inputting instructions to said second input device;
   (B) said first remote control unit further comprises a memory device, coupled to said first processor for storing and providing access to biologic identification information pertaining to persons authorized to use said second remote control unit;
   (C) said first processor is further operative to store and to access said information in said memory;
   (D) said second processor further is operative to cause said second transmitting device to transmit a biologic signal representing said biologic identification information of said inputting person;
   (F) said first receiving device is further operative to receive said biologic signal;
   (G) said first processor is further operative to compare
      (i) said stored biologic identification information pertaining to said authorized persons, with
      (ii) said received biologic identification information pertaining to said inputting person;
   and to analyze said information to determine if said stored and said received biologic information are substantially similar; and
   (G) said first processor is operative to provide a representation of at least one of (i) said analysis and (ii) said determination to said first display device.
26. The system described above, wherein
   (A) said first processor is further operative to receive a first transfer instruction inputted by said first input device;
   (B) in response thereto, said first processor is further operative to cause said first transmitting device to produce a first transfer signal for transmission to said vehicle receiving device;
   (C) said vehicle receiving device is further operative to receive said first transfer signal;
   (D) in response thereto, said vehicle receiving device is rendered operative to receive said second instruction signal;
thereby allowing said second remote control unit to directly control said vehicle.
27. The system described above, wherein
   (A) said first processor is further operative to receive a second transfer instruction inputted by said first input device;
   (B) in response thereto, said first processor is further operative to cause said first transmitting device to produce a second transfer signal for transmission to said vehicle receiving device;
   (C) said vehicle receiving device is further operative to receive said second transfer signal;
   (D) in response thereto, said vehicle processor is rendered operative to receive said second instruction signal;
thereby allowing said second remote control unit to directly control said vehicle.
28. The system described above, wherein
   (A) said first processor is further operative to receive a third transfer instruction inputted by said first input device;
   (B) in response thereto, said first processor is further operative to cause said first transmitting device to produce a third transfer signal for transmission to said second receiving device;
   (C) said second receiving device is further operative to receive said third transfer signal;
   (D) in response to receipt of said third transfer signal, said second processor is further operative to cause said second transmitting device to transmit first instruction signals in response to inputted second instructions;
thereby allowing said second remote control unit to directly control said vehicle.

29. The system described above, wherein
(A) said first processor is further operative to receive a fourth transfer instruction inputted by said first input device;
(B) in response thereto, said first processor is further operative to cause said first transmitting device to produce a fourth transfer signal for transmission to said vehicle receiving device;
(C) said vehicle receiving device is further operative to receive said fourth transfer signal;
(D) in response thereto, said vehicle receiving device is rendered inoperative to receive said second instruction signal;
thereby rescinding said first transfer instruction and preventing said second remote control unit from directly controlling said vehicle.

30. The system described above, wherein
(A) said first processor is further operative to receive a fifth transfer instruction inputted by said first input device;
(B) in response thereto, said first processor is further operative to cause said first transmitting device to produce a fifth transfer signal for transmission to said vehicle receiving device;
(C) said vehicle receiving device is further operative to receive said fifth transfer signal;
(D) in response thereto, said vehicle processor is rendered inoperative to receive said second instruction signal;
thereby rescinding said second transfer instruction and preventing said second remote control unit from directly controlling said vehicle.

31. The system described above, wherein
(A) said first processor is further operative to receive a sixth transfer instruction inputted by said first input device;
(B) in response thereto, said first processor is further operative to cause said first transmitting device to produce a sixth transfer signal for transmission to said second receiving device;
(C) said second receiving device is further operative to receive said sixth transfer signal;
(D) in response to receipt of said sixth transfer signal, said second processor is no longer operative to cause said second transmitting device to transmit first instruction signals in response to inputted second instructions;
thereby rescinding said third transfer instruction and preventing said second remote control unit from directly controlling said vehicle.

32. A method of confirming the identification of the pilot of an unmanned, remotely controlled vehicle ("UV"), said method comprising the steps of:
(1) certifying that both alphanumeric and biologic identification information of a person who wishes to be considered a registered UV pilot, each pertain to the same person;
(2) storing said certified identification information as the person's identification information in a computer memory of registered UV pilots ("stored II");
(3) transmitting a request from a UV police authority to a UV for the presentation of the identification information pertaining to the pilot ("pilot II") of said UV;
(4) transmitting said request from said UV to a remote control station ("RCS") in which is located the pilot who controls said UV;
(5) transmitting said pilot II from said RCS to said UV;
(6) transmitting said pilot II from said UV to said UV police authority;
(7) said police authority utilizing said computational device to compare said received pilot II with said stored II of registered pilots in said computer memory; and
(8) indicating to said police authority whether or not said UV pilot is a registered pilot.

33. The method described above, further including a step (9) of taking a police action selected from the group consisting of (a) destroying the UV, (b) escorting the UV, and (c) taking control of the UV,
if said step (8) indicates that said pilot is not a registered pilot.

34. The method described above, wherein said biologic identification information comprises at least one visual image selected from the group:
(a) an image of a face;
(b) an image of a retina;
(c) an image of an iris;
(d) an image of at least one fingerprint; and
(e) an image of a palm print;
(f) a voice print; and
(g) a DNA sample.

35. The method described above, wherein
(A) said step (5) further includes transmitting a plurality of images showing:
(i) a hand of said UV pilot actuating an input device for controlling said UV,
(ii) at least one biologic identifier selected from the group consisting of: a face, a retina, an iris, a fingerprint and a palm print of said UV pilot, and
(iii) contiguous body parts situated between said hand and said biologic identifier;
wherein said images allow an identification of said UV pilot actuating said input device;
(B) said step (5) further includes transmitting a control instruction for said RCS to said UV;
(C) said step (6) further includes transmitting said images and said instruction from said UV to said police authority;
(D) said step (7) further includes utilizing said computational device to determine said inputted instruction; and
and further comprising a step (10) of comparing the received control instruction with at least one image of the hand of said UV pilot actuating an input device for controlling said UV,
whereby said police authority determines whether the vehicle under observation is being piloted by the pilot whose biologic identification has been inputted.

36. The method described above, wherein
(E) said step (3) further comprises transmitting a request to said UV pilot to input a first police-requested instruction ("PI") to said RCS input device;
(F) said step (4) further comprises transmitting said first requested PI to said RCS; and
(G) said step (10) further comprises comparing said received control instruction with said first requested PI;
whereby said police authority determines if said first requested PI was inputted by said UV pilot.

37. The method described above, further including a step (11) of taking a police action against said UV selected from the group consisting of (a) destroying the UV, (b) escorting the UV, and (c) taking control of the UV
if said step (10) indicates that said UV is not piloted by a registered pilot.

38. The method described above, wherein
(A) said step (5) further includes transmitting a plurality of images showing:
(i) a hand of said UV pilot actuating an input device for controlling said UV,
(ii) at least one biologic identifier selected from the group consisting of: a face, a retina, an iris, a fingerprint and a palm print of said UV pilot, and
(iii) contiguous body parts situated between said hand and said biologic identifier;

wherein said images allow an identification of said UV pilot actuating said input device;

(B) said step (5) further includes transmitting a control instruction for said RCS to said UV;

(C) said step (6) further includes transmitting telemetry signals from said UV, indicating the results of said instruction, to said police authority;

(D) said step (7) further includes utilizing said computational device to analyze the results of said inputted instruction on a motion of said UV; and and further comprising a step (12) of comparing said resulting UV motion with at least one image of the hand of said UV pilot actuating an input device for controlling said UV;

whereby said police authority determines whether the vehicle under observation is being piloted by the pilot whose biologic identification has been inputted.

39. The method described above, wherein (E) said step (3) further comprises transmitting a request to said UV pilot to input a second police-requested instruction ("PI") to said RCS input device;

(F) said step (4) further comprises transmitting said second requested PI to said RCS; and (G) said step (12) further includes comparing said resulting UV motion with said second requested PI;

whereby said police authority determines if said second requested PI was inputted by said UV pilot.

40. The method described above, further comprising the step of taking a police action against said UV selected from the group consisting of (a) destroying the UV, (b) escorting the UV, and (c) taking control of the UV;

if said step (12) indicates that said UV is not piloted by a registered pilot.

41. The method described above, wherein said UV is selected from the group consisting of an unmanned aerial vehicle, an unmanned ground vehicle, and unmanned underwater vehicle, an unmanned space vehicle.

42. The method described above, wherein said telemetry signals convey vehicle information including at least one of: an altitude, a latitude, a longitude, GPS coordinates, a velocity, a rate of climb, a rate of descent, a horizontal acceleration, a vertical acceleration, an attitude, a pitch, a yaw, a rate of roll, a rate of change of pitch, and a rate of change of yaw.

43. A method of confirming the identification of the pilot of an unmanned, remotely controlled vehicle ("UV"), said method comprising the steps of:

(1) certifying that both alphanumeric and biologic identification information of a person who wishes to be considered a registered UV pilot, each pertain to the same person;

(2) storing said certified identification information as the person's identification information in a computer memory of registered UV pilots ("stored II");

(3) transmitting a request from a UV police authority to a remote control station ("RCS") which controls said UV for the presentation of the identification information pertaining to the pilot ("pilot II") of said UV;

(4) transmitting said pilot II from said RCS to said UV police authority;

(5) said police authority utilizing said computational device to compare said received pilot II with said stored II of registered pilots in said computer memory; and (6) indicating to said police authority whether or not said UV pilot is a registered pilot.

44. An unmanned vehicle system, which is remotely controllable from a control source with police apparatus located remotely from each of said vehicle and said control source, comprising:

(A) a remotely controlled vehicle comprising:

(1) a vehicle receiving device, for receiving instruction signals from each of said control source and said police apparatus;

(2) a vehicle processor, coupled to said vehicle receiving device, for receiving instructions specified by said instruction signals, and producing operational control signals for the vehicle in response to said instructions;

(3) at least one actuator, coupled to said processor, responsive to said operational control signals, for actuating at least one of:

(i) at least one device for controlling an orientation of said vehicle, and (ii) at least one device for controlling at least one of (i) a velocity, and (ii) an acceleration, of said vehicle;

(4) at least one sensing device, coupled to said vehicle processor, for sensing vehicle data and supplying sensed vehicle data signals to said vehicle processor representing said sensed vehicle data; and (5) a vehicle transmitting device, coupled to said vehicle processor, for transmitting said signals representing said sensed vehicle data;

(B) a remote control unit for providing at least one biologic identifier signal and said instruction signals, said remote control unit comprising:

(1) a remote control transmitting device, for transmitting said instruction signals and said at least one biologic identifier signal;

(2) a remote control receiving device for receiving said sensed vehicle data signals;

(3) a first remote control input device for manually inputting instructions;

(4) a second remote control input device for inputting biologic identification information pertaining to a pilot using the remote control unit;

(5) a display device for displaying information; and (6) a remote control processor, coupled to each of said remote control transmitting device, said remote control receiving device, said first remote control input device, said second remote control input device and said display device, for (i) generating instruction signals representing said inputted instructions and generating said at least one biologic identifier signal representing said inputted biologic identification information and causing said remote control transmitting device to transmit said signals to said vehicle receiving device, and (ii) processing signals representing said sensed vehicle data received by said remote control receiving device and supplying said signals to said remote control display device;

(C) a police unit for communicating with said unmanned vehicle comprising:

(1) a police transmitting device, for transmitting an interrogation signal to said vehicle receiving device;

(2) a police receiving device, for receiving said at least one biologic identifier signal from said vehicle transmitting device;

(3) a memory device, for storing and providing certified biologic identification information and respective alphanumeric identification information pertaining to each of a plurality of persons; and (4) a police processor, coupled to each of said police transmitting device, said police receiving device, and said memory device, for
- (i) storing said certified biologic and said respective alphanumeric identification information in said memory and retrieving it therefrom,
- (ii) generating an interrogation signal for transmission to said vehicle receiving device,
- (iii) receiving said biologic identification information from said police receiving device, and comparing it to said stored certified biologic identification information, and
- (iv) indicating a match between said stored certified biologic identification information and said received biologic identification information;

wherein
(I) said vehicle processor is further operative to supply said signals representing said sensed vehicle data to said vehicle transmitting device, and to cause said transmitting device to transmit said signals to said remote control receiving device;
(II) said remote control unit display device is operative to display a representation of said sensed vehicle data;
(III) said vehicle receiving device is operative to receive said interrogation signal from said police transmitting device;
(IV) in response to said received interrogation signal, said vehicle processor is operative to cause said vehicle transmitting device to relay said interrogation signal to said remote control receiving device;
(V) in response to said received interrogation signal, said remote control processor is operative to cause said remote control transmitting device to transmit said at least one biologic identifier signal to said vehicle receiving device;
(VI) said vehicle processor is further operative to relay said received biologic identification information to said police receiving device, for comparison to said stored certified biologic information;

whereby
(a) the motion of said unmanned vehicle is controlled by said pilot by inputting instructions to said vehicle input device, in response to a representation of vehicle data displayed by said display device;
(b) said interrogation signal is transmitted from said police unit to said vehicle and thence to said remote control unit, and in response thereto, said biologic identification information is transmitted from said remote control unit to said vehicle and thence to said police unit;

thereby
to allow said police unit to determine the identity of the person controlling an unmanned vehicle.

45. The system described above, wherein said unmanned vehicle is selected from the group consisting of:
   (A) an unmanned aerial vehicle,
   (B) an unmanned ground vehicle,
   (C) an unmanned underwater vehicle, and
   (D) an unmanned space vehicle.

46. The system described above, wherein said biologic identification information is selected from the group consisting of:
   (A) an image of a face;
   (B) an image of a retina;
   (C) an image of an iris of an eye;
   (D) at least one fingerprint;
   (E) at least one palm print;
   (F) a voiceprint; and
   (G) a DNA sample.

47. The system described above, wherein said second input device comprises at least one of:
   (A) at least one video camera; and
   (B) a microphone.

48. The system described above, wherein said police unit further comprises a police display device, coupled to said police processor.

49. The system described above, wherein said police display device is operative to display at least one of:
   (A) said certified biologic identification information;
   (B) said received biologic identification information;
   (C) a comparison of (i) said certified biologic identification information, and (ii) said received biologic identification information; and
   (D) said indication of a match between (i) said certified biologic identification information, and (ii) said received biologic identification information; or the absence thereof.

50. The system described above, wherein said police processor is operative to cause said police transmitting device to transmit a violation signal in response to at least one of:
   (1) an absence of the receipt of said biologic information, following the transmission of an interrogation signal, and
   (2) an absence of a match between said certified biologic identification information and said received biologic information.

51. The system described above, wherein said police processor is operative to cause said police transmitting device to transmit at least one high output signal for interfering with at least one of
   (A) said remote control receiving device, and
   (B) said vehicle receiving device, in response to at least one of:
   (1) an absence of the receipt of said biologic information, following the transmission of an interrogation signal, and
   (2) an absence of a match between said certified biologic identification information and said received biologic information.

52. The system described above, wherein
   (A) said police unit further comprises a projectile-generating weapon for destroying said unmanned vehicle, having an input for inputting an activation signal, coupled to said police processor;
   (B) said weapon launches said projectile in response to an inputted activation signal; and
   (C) said processor is operative to generate said activation signal in response to at least one of:
   (1) an absence of the receipt of said biologic information, following the transmission of an interrogation signal, and
   (2) an absence of a match between said certified biologic identification information and said received biologic information.

53. The system described above, wherein said police unit further comprises an input device, coupled to said police processor, and wherein an inputted interrogation request causes said processor to generate a respective interrogation signal.

54. The system described above, wherein said police transmitting device is further operative to transmit said interrogation signal directly to said control unit receiving device, and wherein said control unit receiving device is further operative to receive said interrogation signal directly from said police unit transmitting device.

55. The system described above, wherein said control unit display device is further operative to display a representation of said interrogation signal.

56. The system described above, wherein said remote control transmitting device is further operative to transmit said at least one biologic identifier signal directly to said police receiving device, and wherein said receiving device is operative to receive said identifier signal directly from said remote control transmitting device.

57. The system described above, wherein said second input device is a video camera for generating signals representing a plurality of images, each such image showing each of:
   (i) the hand of said pilot providing an inputted instruction to said first remote control input device,
   (ii) at least one body part of the pilot selected from the group consisting of: a face, a retina, an iris, a fingerprint and a palm print, and
   (iii) the contiguous body parts of the pilot situated between said hand and said biologic identifier;
   whereby said images allow for the identification of the person inputting said instructions.

58. The system described above, wherein said images also show at least one of:
   (A) the display device of said remote control unit, and
   (B) the first remote control input device; thereby to allow for the determination that said pilot inputted a specific instruction.

59. The system described above, wherein
   (A) said police processor is further operative to cause said police transmitting device to transmit a second interrogation signal, requesting the transmission of said instruction signals from said unmanned vehicle;
   (B) said vehicle receiving device is further operative to receive said second interrogation signal, for input to said vehicle processor;
   (C) said vehicle processor is further operative to cause said vehicle transmitting device to transmit said received instructions to said police receiving device, in response to the receipt of said second interrogation signal from said police transmitting device;
   (D) said police processor is further operative analyze said received instruction signals, to determine the respective instructions represented by said instruction signals;
   (E) said police unit further comprises a police display device, coupled to said police processor, for display of
      (i) a representation of said respective instructions, and
      (ii) said images inputted by said video camera;
   whereby
   a police person, observing said police display device, determines whether the person inputting said instructions is the source of instructions received by said unmanned vehicle.

60. The system described above, wherein
   (A) said police processor is further operative to cause said police transmitting device to transmit a third interrogation signal, requesting the transmission of said instruction signals from said unmanned vehicle to said police unit;
   (B) each of said vehicle receiving device, said vehicle processor, said vehicle transmitting device and said remote control receiving device is, sequentially, operative to relay said third interrogation signal to said remote control processor, and said processor is operative to cause said display device to display a representation of said request to said pilot;
   (C) said first remote control input device is operative to input a forward instruction indirectly command to said remote control processor and said processor is operative to cause said remote control transmitting device to transmit a forward instruction signal to said vehicle receiving device;
   (D) said vehicle processor is further operative to cause said vehicle transmitting device to transmit said received instructions to said police receiving device, in response to the receipt of said forward instruction signal from said remote control unit processor;
   (E) said police processor is further operative analyze said received instruction signals, to determine the respective instructions represented by said instruction signals;
   (F) said police unit further comprises a police display device, coupled to said police processor, for display of
      (i) a representation of said respective instructions, and
      (ii) said images inputted by said video camera;
   whereby
   a police person, observing said police display device, determines whether the person inputting said instructions is the source of instructions received by said unmanned vehicle.

61. The system described above, wherein
   (A) said police processor is further operative to cause said police transmitting device to transmit a fourth interrogation signal, requesting the transmission of said instruction signals directly from said remote control unit to said police receiving device;
   (B) each of said vehicle receiving device, said vehicle processor, said vehicle transmitting device and said remote control receiving device is, sequentially, operative to relay said fourth interrogation signal to said remote control processor, and said processor is operative to cause said display device to display a representation of said request to said pilot;
   (C) said first remote control input device is operative to input a forward instruction directly command to said remote control processor and said processor is operative to cause said remote control transmitting device to additionally transmit said instructions to said police receiving device;
   (D) said police processor is further operative analyze said received instruction signals, to determine the respective instructions represented by said instruction signals;
   (E) said police unit further comprises a police display device, coupled to said police processor, for display of
      (i) a representation of said respective instructions transmitted by said remote control transmitting device, and
      (ii) said images inputted by said video camera;
   whereby
   a police person, observing said police display device, determines whether the person inputting said instructions is the source of instructions received by said unmanned vehicle.

62. The system described above, wherein
   (A) said police processor is further operative to cause said police transmitting device to transmit a fifth interrogation signal directly to said remote control unit receiving device, requesting the transmission of said instruction signals from said unmanned vehicle to said police unit;
   (B) said remote control receiving device is operative to receive said fifth interrogation signal, and said remote control processor is operative to cause said display device to display a representation of said request to said pilot;
   (C) said first remote control input device is operative to input a forward instruction indirectly command to said remote control processor and said processor is operative to cause said remote control transmitting device to transmit a forward instruction signal to said vehicle receiving device;
   (D) said vehicle processor is further operative to cause said vehicle transmitting device to transmit said received instructions to said police receiving device, in response to the receipt of said forward instruction signal from said remote control unit processor;
   (E) said police processor is further operative analyze said received instruction signals, to determine the respective instructions represented by said instruction signals;
   (F) said police unit further comprises a police display device, coupled to said police processor, for display of
      (i) a representation of said respective instructions, and
      (ii) said images inputted by said video camera;

whereby
a police person, observing said police display device, determines whether the person inputting said instructions is the source of instructions received by said unmanned vehicle.

63. The system described above, wherein
(A) said police processor is further operative to cause said police transmitting device to transmit a sixth interrogation signal directly to said remote control unit receiving device, requesting the transmission of said instruction signals directly from said remote control unit to said police receiving device;
(B) said remote control receiving device is operative to receive said sixth interrogation signal, and said remote control processor is operative to cause said display device to display a representation of said request to said pilot;
(C) said first remote control input device is operative to input a forward instruction directly command to said remote control processor and said processor is operative to cause said remote control transmitting device to additionally transmit said instructions to said police receiving device;
(D) said police processor is further operative analyze said received instruction signals, to determine the respective instructions represented by said instruction signals;
(E) said police unit further comprises a police display device, coupled to said police processor, for display of
(i) a representation of said respective instructions transmitted by said remote control transmitting device, and
(ii) said images inputted by said video camera;
whereby
a police person, observing said police display device, determines whether the person inputting said instructions is the source of instructions received by said unmanned vehicle.

64. The system described above, wherein said at least one sensing device comprises at least one apparatus for determining:
(A) an altitude,
(B) a latitude,
(C) a longitude,
(D) GPS coordinates,
(E) a velocity,
(F) a rate of climb,
(G) a rate of descent,
(H) a horizontal acceleration,
(I) a vertical acceleration,
(J) an attitude,
(K) a pitch,
(L) a yaw,
(M) a rate of roll,
(N) a rate of change of pitch, and
(O) a rate of change of yaw.

65. The system described above, wherein
(A) said police processor is further operative to cause said police transmitting device to transmit a seventh interrogation signal, requesting the transmission of said sensed vehicle data signals from said unmanned vehicle;
(B) said vehicle receiving device is further operative to receive said seventh interrogation signal, for input to said vehicle processor;
(C) said vehicle processor is further operative to cause said vehicle transmitting device to transmit said sensed vehicle data signals to said police receiving device, in response to the receipt of said seventh interrogation signal from said police transmitting device;
(D) said police processor is further operative analyze said received sensed vehicle data signals, to determine at least one of (a) said sensed vehicle data, and (b) a respective vehicle motion;
(E) said police unit further comprises a police display device, coupled to said police processor, for display of
(i) a representation of at least one of (a) said sensed vehicle data, and (b) said respective vehicle motion, and
(ii) said images inputted by said video camera;
whereby
a police person, observing said police display device, determines whether the person inputting said instructions is the source of instructions causing the observed vehicle motion.

66. The system described above, wherein
(A) said police processor is further operative to cause said police transmitting device to transmit an eighth interrogation signal, requesting the transmission of said sensed vehicle data signals from said unmanned vehicle to said police unit;
(B) each of said vehicle receiving device, said vehicle processor, said vehicle transmitting device and said remote control receiving device is, sequentially, operative to relay said eighth interrogation signal to said remote control processor, and said processor is operative to cause said display device to display a representation of said request to said pilot;
(C) said first remote control input device is operative to input a forward sensed vehicle data indirectly command to said remote control processor and said processor is operative to cause said remote control transmitting device to transmit a forward sensed vehicle data signal to said vehicle receiving device;
(D) said vehicle processor is further operative to cause said vehicle transmitting device to transmit said sensed vehicle data signals to said police receiving device, in response to the receipt of said forward sensed vehicle data signal from said remote control unit processor;
(E) said police processor is further operative analyze said received sensed vehicle data signals, to determine at least one of (a) said sensed vehicle data, and (b) a respective vehicle motion;
(F) said police unit further comprises a police display device, coupled to said police processor, for display of
(i) a representation of at least one of (a) said sensed vehicle data, and (b) said respective vehicle motion, and
(ii) said images inputted by said video camera;
whereby
a police person, observing said police display device, determines whether the person inputting said instructions is the source of instructions causing the observed vehicle motion.

67. The system described above, wherein
(A) said police processor is further operative to cause said police transmitting device to transmit a ninth interrogation signal, requesting the transmission of said sensed vehicle data signals directly from said remote control unit to said police receiving device;
(B) each of said vehicle receiving device, said vehicle processor, said vehicle transmitting device and said remote control receiving device is, sequentially, operative to relay said ninth interrogation signal to said remote control processor, and said processor is operative to cause said display device to display a representation of said request to said pilot;
(C) said first remote control input device is operative to input a forward sensed vehicle data directly command to said remote control processor and said processor is operative to cause said remote control transmitting device to transmit said sensed vehicle data signals to said police receiving device;
(D) said police processor is further operative analyze said received sensed vehicle data signals, to determine at least one of (a) said sensed vehicle data, and (b) a respective vehicle motion;

(E) said police unit further comprises a police display device, coupled to said police processor, for display of
(i) a representation of at least one of (a) said sensed vehicle data, and (b) said respective vehicle motion, and
(ii) said images inputted by said video camera;
whereby
a police person, observing said police display device, determines whether the person inputting said instructions is the source of instructions causing the observed vehicle motion.

68. The system described above, wherein
(A) said police processor is further operative to cause said police transmitting device to transmit a tenth interrogation signal directly to said remote control unit receiving device, requesting the transmission of said sensed vehicle data signals from said unmanned vehicle to said police unit;
(B) said remote control receiving device is operative to receive said tenth interrogation signal, and said remote control processor is operative to cause said display device to display a representation of said request to said pilot;
(C) said first remote control input device is operative to input a forward sensed vehicle data indirectly command to said remote control processor and said processor is operative to cause said remote control transmitting device to transmit a forward sensed vehicle data signal to said vehicle receiving device;
(D) said vehicle processor is further operative to cause said vehicle transmitting device to transmit said sensed vehicle data signals to said police receiving device, in response to the receipt of said forward sensed vehicle data signal from said remote control unit processor;
(E) said police processor is further operative analyze said received sensed vehicle data signals, to determine at least one of (a) said sensed vehicle data, and (b) a respective vehicle motion;
(F) said police unit further comprises a police display device, coupled to said police processor, for display of
(i) a representation of at least one of (a) said sensed vehicle data, and (b) said respective vehicle motion, and
(ii) said images inputted by said video camera;
whereby
a police person, observing said police display device, determines whether the person inputting said instructions is the source of instructions causing the observed vehicle motion.

69. The system described above, wherein
(A) said police processor is further operative to cause said police transmitting device to transmit an eleventh interrogation signal directly to said remote control unit receiving device, requesting the transmission of said sensed vehicle data signals directly from said remote control unit to said police receiving device;
(B) said remote control receiving device is operative to receive said eleventh interrogation signal, and said remote control processor is operative to cause said display device to display a representation of said request to said pilot;
(C) said first remote control input device is operative to input a forward sensed vehicle data signals directly command to said remote control processor and said processor is operative to cause said remote control transmitting device to transmit said sensed vehicle data signals to said police receiving device;
(D) said police processor is further operative analyze said received sensed vehicle data signals, to determine at least one of (a) said sensed vehicle data, and (b) a respective vehicle motion;

(E) said police unit further comprises a police display device, coupled to said police processor, for display of
(i) a representation of at least one of (a) said sensed vehicle data, and (b) said respective vehicle motion, and
(ii) said images inputted by said video camera;
whereby
a police person, observing said police display device, determines whether the person inputting said instructions is the source of instructions causing the observed vehicle motion.

70. The system described above, wherein
(A) said police processor is further operative to generate a maneuver signal requesting said pilot to input a police-specified instruction for said unmanned vehicle to execute a police-specified maneuver;
(B) said police processor is further operative to cause said police transmitting device to transmit said maneuver signal to said remote control receiving device; and
(C) said remote control processor is further operative to cause said display device to display a representation of said maneuver signal for said pilot.

71. The system described above, wherein said maneuver signal is transmitted from said police transmitting device to said vehicle receiving device; and thence sequentially to each of: said vehicle processor, said vehicle transmitting device and said remote control receiving device.

72. The system described above, wherein said maneuver signal is transmitted from said police transmitting device directly to said remote control receiving device without transmission to said vehicle receiving device.

73. The system described above, wherein said police specified maneuver is selected from the group:
(A) a roll,
(B) a bank,
(C) a turn,
(D) a descent,
(E) an ascent,
(F) an acceleration,
(G) a deceleration, and
(H) an emission of a light signal.

74. The system described above, wherein
(A) said police processor is further operative to cause said police transmitting device to transmit a twelfth interrogation signal, requesting the transmission of said sensed vehicle data signals from said unmanned vehicle;
(B) said vehicle receiving device is further operative to receive said twelfth interrogation signal, for input to said vehicle processor;
(C) said vehicle processor is further operative to cause said vehicle transmitting device to transmit said sensed vehicle data signals to said police receiving device, in response to the receipt of said twelfth interrogation signal from said police transmitting device;
(D) said police processor is further operative to analyze said received sensed vehicle data signals, to determine at least one of (a) said sensed vehicle data, and (b) a respective vehicle motion, following the transmission of said maneuver signal;
(E) said police unit further comprises a police display device, coupled to said police processor, for display of
(i) a representation of at least one of (a) said sensed vehicle data, and (b) said respective vehicle motion following the transmission of said maneuver signal, and
(ii) a representation of the police-specified maneuver requested by said maneuver signal;

whereby a police person, observing said police display device, determines whether an identified pilot is the person controlling said unmanned vehicle.

75. The system described above, wherein (A) said police processor is further operative to cause said police transmitting device to transmit a thirteenth interrogation signal, requesting the transmission of said sensed vehicle data signals from said unmanned vehicle;

(B) said vehicle receiving device is further operative to receive said thirteenth interrogation signal, for input to said vehicle processor;

(C) said vehicle processor is further operative to cause said vehicle transmitting device to transmit said sensed vehicle data signals to said police receiving device, in response to the receipt of said thirteenth interrogation signal from said police transmitting device;

(D) said police processor is further operative to analyze said received sensed vehicle data signals, to determine at least one of (a) said sensed vehicle data, and (b) a respective vehicle motion, following the transmission of said maneuver signal;

(E) said police processor is further operative to compare
(i) at least one of (a) said sensed vehicle data, and (b) said respective vehicle motion following the transmission of said maneuver signal, and
(ii) a motion consistent with the police-specified maneuver requested by said maneuver signal;

(F) said police processor is further operative to provide a first comparison signal indicating the result of said comparison;

whereby said police processor provides information concerning whether an identified pilot is the person controlling said unmanned vehicle.

76. The system described above, wherein (A) said police processor is further operative to cause said police transmitting device to transmit a fourteenth interrogation signal, requesting the transmission of said sensed vehicle data signals to said police receiving device;

(B) said remote control receiving device is further operative to receive said fourteenth interrogation signal, and said remote control processor is operative to cause said display device to display a representation of said request to said pilot;

(C) said first remote control input device is operative to input a forward sensed vehicle data signals command to said remote control processor and said processor is operative to cause the transmission of said sensed vehicle data signals to said police receiving device;

(D) said police processor is further operative to analyze said received sensed vehicle data signals, to determine at least one of (a) said sensed vehicle data, and (b) a respective vehicle motion, following the transmission of said maneuver signal;

(E) said police unit further comprises a police display device, coupled to said police processor, for display of
(i) a representation of at least one of (a) said sensed vehicle data, and (b) said respective vehicle motion following the transmission of said maneuver signal, and
(ii) a representation of the police-specified maneuver requested by said maneuver signal;

whereby a police person, observing said police display device, determines whether an identified pilot is the person controlling said unmanned vehicle.

77. The system described above, wherein (A) the route of said fourteenth interrogation signal is selected from the group comprising:
(i) directly from police unit to remote control unit, and
(ii) from police unit to unmanned vehicle and thence to remote control unit; and (B) the source of said sensed vehicle data signals is selected from the group comprising:
(i) said vehicle, following the receipt of a transfer command from said remote control unit, and
(ii) said remote control unit.

78. The system described above, wherein (A) said police processor is further operative to cause said police transmitting device to transmit a fifteenth interrogation signal, requesting the transmission of said sensed vehicle data signals to said police receiving device;

(B) said remote control receiving device is further operative to receive said fifteenth interrogation signal, and said remote control processor is operative to cause said display device to display a representation of said request to said pilot;

(C) said first remote control input device is operative to input a forward sensed vehicle data signals command to said remote control processor and said processor is operative to cause the transmission of said sensed vehicle data signals to said police receiving device;

(D) said police processor is further operative to analyze said received sensed vehicle data signals, to determine at least one of (a) said sensed vehicle data, and (b) a respective vehicle motion, following the transmission of said maneuver signal;

(E) said police processor is further operative to compare
(i) at least one of (a) said sensed vehicle data, and (b) said respective vehicle motion following the transmission of said maneuver signal, and
(ii) a motion consistent with the police-specified maneuver requested by said maneuver signal;

(F) said police processor is further operative to provide a second comparison signal indicating the result of said comparison;

whereby said police processor provides information concerning whether an identified pilot is the person controlling said unmanned vehicle.

79. The system described above, wherein (A) the route of said fifteenth interrogation signal is selected from the group comprising:
(i) directly from police unit to remote control unit, and
(ii) from police unit to unmanned vehicle and thence to remote control unit; and (B) the source of said sensed vehicle data signals is selected from the group comprising:
(i) said vehicle, following the receipt of a transfer command from said remote control unit, and
(ii) said remote control unit.

80. The system described above, wherein (A) said police processor is further operative to cause said police transmitting device to transmit a sixteenth interrogation signal, requesting the transmission of said instruction signals from said unmanned vehicle;

(B) said vehicle receiving device is further operative to receive said sixteenth interrogation signal, for input to said vehicle processor;

(C) said vehicle processor is further operative to cause said vehicle transmitting device to transmit said instruction signals to said police receiving device, in response to the receipt of said sixteenth interrogation signal from said police transmitting device;

(D) said police processor is further operative to analyze said received instruction signals, to determine the respective instructions represented by said instruction signals, following the transmission of said maneuver signal;

(E) said police unit further comprises a police display device, coupled to said police processor, for display of
(i) a representation of said respective instructions, following the transmission of said maneuver signal, and
(ii) a representation of the police-specified maneuver requested by said maneuver signal;

whereby
a police person, observing said police display device, determines whether an identified pilot is the person controlling said unmanned vehicle.

81. The system described above, wherein
(A) said police processor is further operative to cause said police transmitting device to transmit a seventeenth interrogation signal, requesting the transmission of said instruction signals from said unmanned vehicle;

(B) said vehicle receiving device is further operative to receive said seventeenth interrogation signal, for input to said vehicle processor;

(C) said vehicle processor is further operative to cause said vehicle transmitting device to transmit said instruction signals to said police receiving device, in response to the receipt of said seventeenth interrogation signal from said police transmitting device;

(D) said police processor is further operative to analyze said received instruction signals, to determine the respective instructions represented by said instruction signals, following the transmission of said maneuver signal;

(E) said police processor is further operative to compare
(i) said respective instructions, following the transmission of said maneuver signal, and
(ii) a motion consistent with the police-specified maneuver requested by said maneuver signal;

(F) said police processor is further operative to provide a third comparison signal indicating the result of said comparison;

whereby
said police processor provides information concerning whether an identified pilot is the person controlling said unmanned vehicle.

82. The system described above, wherein
(A) said police processor is further operative to cause said police transmitting device to transmit an eighteenth interrogation signal, requesting the transmission of said instruction signals to said police receiving device;

(B) said remote control receiving device is further operative to receive said eighteenth interrogation signal, and said remote control processor is operative to cause said display device to display a representation of said request to said pilot;

(C) said first remote control input device is operative to input a forward instruction signals command to said remote control processor and said processor is operative to cause the transmission of said instruction signals to said police receiving device;

(D) said police processor is further operative to analyze said received instruction signals, to determine the respective instructions represented by said instruction signals, following the transmission of said maneuver signal;

(E) said police unit further comprises a police display device, coupled to said police processor, for display of
(i) said respective instructions, following the transmission of said maneuver signal, and
(ii) a representation of the police-specified maneuver requested by said maneuver signal;

whereby
a police person, observing said police display device, determines whether an identified pilot is the person controlling said unmanned vehicle.

83. The system described above, wherein
(A) the route of said eighteenth interrogation signal is selected from the group comprising:
(i) directly from police unit to remote control unit, and
(ii) from police unit to unmanned vehicle and thence to remote control unit; and (B) the source of said instruction signals is selected from the group comprising:
(i) said vehicle, following the receipt of a transfer command from said remote control unit, and
(ii) said remote control unit.

84. The system described above, wherein
(A) said police processor is further operative to cause said police transmitting device to transmit a nineteenth interrogation signal, requesting the transmission of said instruction data signals to said police receiving device;

(B) said remote control receiving device is further operative to receive said nineteenth interrogation signal, and said remote control processor is operative to cause said display device to display a representation of said request to said pilot;

(C) said first remote control input device is operative to input a forward instruction signals command to said remote control processor and said processor is operative to cause the transmission of said instruction signals to said police receiving device;

(D) said police processor is further operative to analyze said received instruction signals, to determine the respective instructions represented by said instruction signals, following the transmission of said maneuver signal;

(E) said police processor is further operative to compare
(i) said respective instructions, following the transmission of said maneuver signal, and
(ii) a motion consistent with the police-specified maneuver requested by said maneuver signal;

(F) said police processor is further operative to provide a fourth comparison signal indicating the result of said comparison;

whereby
said police processor provides information concerning whether an identified pilot is the person controlling said unmanned vehicle.

85. The system described above, wherein
(A) the route of said nineteenth interrogation signal is selected from the group comprising:
(i) directly from police unit to remote control unit, and
(ii) from police unit to unmanned vehicle and thence to remote control unit; and (B) the source of said instruction signals is selected from the group comprising:
(i) said vehicle, following the receipt of a transfer command from said remote control unit, and
(ii) said remote control unit.

86. The system described above, wherein
(I) said second input device is a video camera for generating signals representing a plurality of images, each such image showing each of:
(A) the hand of said pilot providing an inputted instruction to said first remote control input device,
(B) at least one body part of the pilot selected from the group consisting of: a face, a retina, an iris, a fingerprint and a palm print,
(C) the contiguous body parts of the pilot situated between said hand and said biologic identifier, and (D) at least one of:
(i) the display device of said remote control unit, and
(ii) the first remote control input device; and
(II) said police unit further comprises a police display device for displaying:
(A) each of said hand, said pilot body part with biologic identifier, said contiguous body parts and at least one of (i) said remote control display device and (ii) said first remote control input device; and
(B) a representation of the police-specified maneuver requested by said maneuver signal;
whereby
said displayed images allow for the identification of (a) the person inputting the instructions, and (b) the instructions;
thereby
to allow for the determination that said identified pilot inputted the police-specified instruction.

87. The system described above, wherein
(I) said unmanned vehicle further comprises a vehicle memory device, coupled to said vehicle processor for storing and providing identification information identifying said vehicle;
(II) the memory device in said police unit is further operative to store and provide identification information pertaining to each of a plurality of registered vehicles;
(III) said police processor is further operative to store said registered vehicle identification information in said memory device and to retrieve it therefrom;
(IV) said police processor is further operative to generate a vehicle interrogation signal for transmission to said vehicle receiving device, and to cause said police transmitting device to transmit said signal;
(V) in response thereto, said vehicle processor is further operative to retrieve said vehicle identification information from said vehicle memory device, and to cause said vehicle transmitting device to transmit a vehicle ID signal representing said information;
(VI) said police receiving device is further operative to receive said vehicle ID signal:
(VII) said police processor is further operative to compare
(A) said registered vehicle identification information stored in the memory device of said police unit, with
(B) said received vehicle identification information; and
(VIII) said police processor is further operative to indicate a match between said registered vehicle identification information and said received vehicle identification information.

88. The system described above, wherein, in the presence of said match, said police processor is further operative to cause said police transmitting device to transmit at least one of:
(A) a notification signal; and
(B) at least one high output signal for interfering with at least one of
(i) said remote control receiving device, and
(ii) said vehicle receiving device.

89. The system described above, wherein said vehicle memory device is a write-once-only device.

90. The system described above, wherein
(I) said remote control unit further comprises a remote control memory device, coupled to said remote control processor for storing and providing identification information identifying said remote control unit;
(II) the memory device in said police unit is further operative to store and provide identification information pertaining to each of a plurality of registered remote control units;
(III) said police processor is further operative to store said registered remote control unit identification information in said memory device and to retrieve it therefrom;
(IV) said police processor is further operative to generate a remote control interrogation signal for transmission to said remote control receiving device, and to cause said police transmitting device to transmit said signal;
(V) in response thereto, said remote control processor is further operative to retrieve said remote control identification information from said remote control memory device, and to cause said remote control transmitting device to transmit a remote control ID signal representing said information;
(VI) said police receiving device is further operative to receive said remote control ID signal:
(VII) said police processor is further operative to compare
(A) said registered remote control unit identification information stored in the memory device of said police unit, with
(B) said received remote control identification information; and
(VIII) said police processor is further operative to indicate a match between said registered remote control unit identification information and said received remote control identification information.

91. The system described above, wherein, in the absence of said match, said police processor is further operative to cause said police transmitting device to transmit at least one of:
(A) a second notification signal; and
(B) at least one additional high output signal for interfering with at least one of
(i) said remote control receiving device, and
(ii) said vehicle receiving device.

92. The system described above, wherein said remote control memory device is a write-once-only device.

93. The system described above, wherein said memory device of said police unit is a write-once-only device.

94. An unmanned vehicle system, which is remotely controllable from a control source with police apparatus located remotely from each of said vehicle and said control source, comprising:
(A) a remotely controlled vehicle comprising:
(1) a vehicle receiving device, for receiving instruction signals from each of said control source and said police apparatus;
(2) a vehicle processor, coupled to said vehicle receiving device, for receiving instructions specified by said instruction signals, and producing operational control signals for the vehicle in response to said instructions;
(3) at least one actuator, coupled to said processor, responsive to said operational control signals, for actuating at least one of:
(i) at least one device for controlling an orientation of said vehicle, and
(ii) at least one device for controlling at least one of (a) a velocity, and (b) an acceleration, of said vehicle;
(4) at least one sensing device, coupled to said vehicle processor, for sensing vehicle data and supplying sensed vehicle data signals to said vehicle processor representing said sensed vehicle data; and
(5) a vehicle transmitting device, coupled to said vehicle processor, for transmitting said signals representing said sensed vehicle data;
(B) a remote control unit for providing at least one biologic identifier signal and said instruction signals, said remote control unit comprising:

(1) a remote control transmitting device, for transmitting said instruction signals and said at least one biologic identifier signal;

(2) a remote control receiving device for receiving said sensed vehicle data signals;

(3) a first remote control input device for manually inputting instructions;

(4) a second remote control input device for inputting biologic identification information pertaining to a pilot using the remote control unit;

(5) a display device for displaying information; and (6) a remote control processor, coupled to each of said remote control transmitting device, said remote control receiving device, said first remote control input device, said second remote control input device and said display device, for (i) generating instruction signals representing said inputted instructions and causing said remote control transmitting device to transmit said signals to said vehicle receiving device, (ii) processing signals representing said sensed vehicle data received by said remote control receiving device and supplying said signals to said remote control display device, and (iii) generating said at least one biologic identifier signal representing said inputted biologic identification information;

(C) a police unit for communicating with said unmanned vehicle comprising:

(1) a police transmitting device, for transmitting an interrogation signal to said vehicle receiving device;

(2) a police receiving device, for receiving said at least one biologic identifier signal;

(3) a memory device, for storing and providing certified biologic identification information and respective alphanumeric identification information pertaining to each of a plurality of persons; and (4) a police processor, coupled to each of said police transmitting device, said police receiving device, and said memory device, for (i) storing said certified biologic and said respective alphanumeric identification information in said memory and retrieving it therefrom, and (ii) generating an interrogation signal for transmission to said remote control receiving device, wherein (I) said vehicle processor is further operative to supply said signals representing said sensed vehicle data to said vehicle transmitting device, and to cause said transmitting device to transmit said signals to said remote control receiving device;

(II) said remote control unit display device is operative to display a representation of said sensed vehicle data;

(III) said remote control receiving device is operative to receive said interrogation signal from said police transmitting device; and (IV) in response to said received interrogation signal, said remote control processor is operative to cause said remote control transmitting device to transmit said at least one biologic identifier signal to said police receiving device;

(V) said police processor is further operative to receive said biologic identification information from said police receiving device and to compare it to said stored certified biologic identification information, and indicate a match between said stored certified biologic identification information and said received biologic identification information;

whereby (a) the motion of said unmanned vehicle is controlled by said pilot by inputting instructions to said vehicle input device, in response to a representation of vehicle data displayed by said display device;

(b) said interrogation signal is transmitted from said police unit to said remote control unit, and in response thereto, said biologic identification information is transmitted from said remote control unit to said police unit;

thereby to allow said police unit to determine the identity of the person controlling an unmanned vehicle.

BRIEF DESCRIPTION OF THE DRAWINGS

FIG. 15, comprising

DESCRIPTION OF THE PREFERRED EMBODIMENTS

Figure 1:
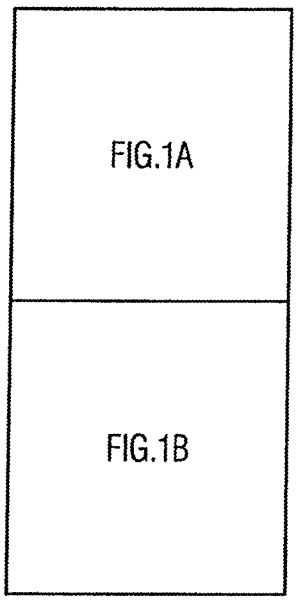
FIG. 1, comprising FIGS. 1A and 1B in combination shows a flow diagram of the operation of an algorithm for the policing of UAs.
Figure 1A:
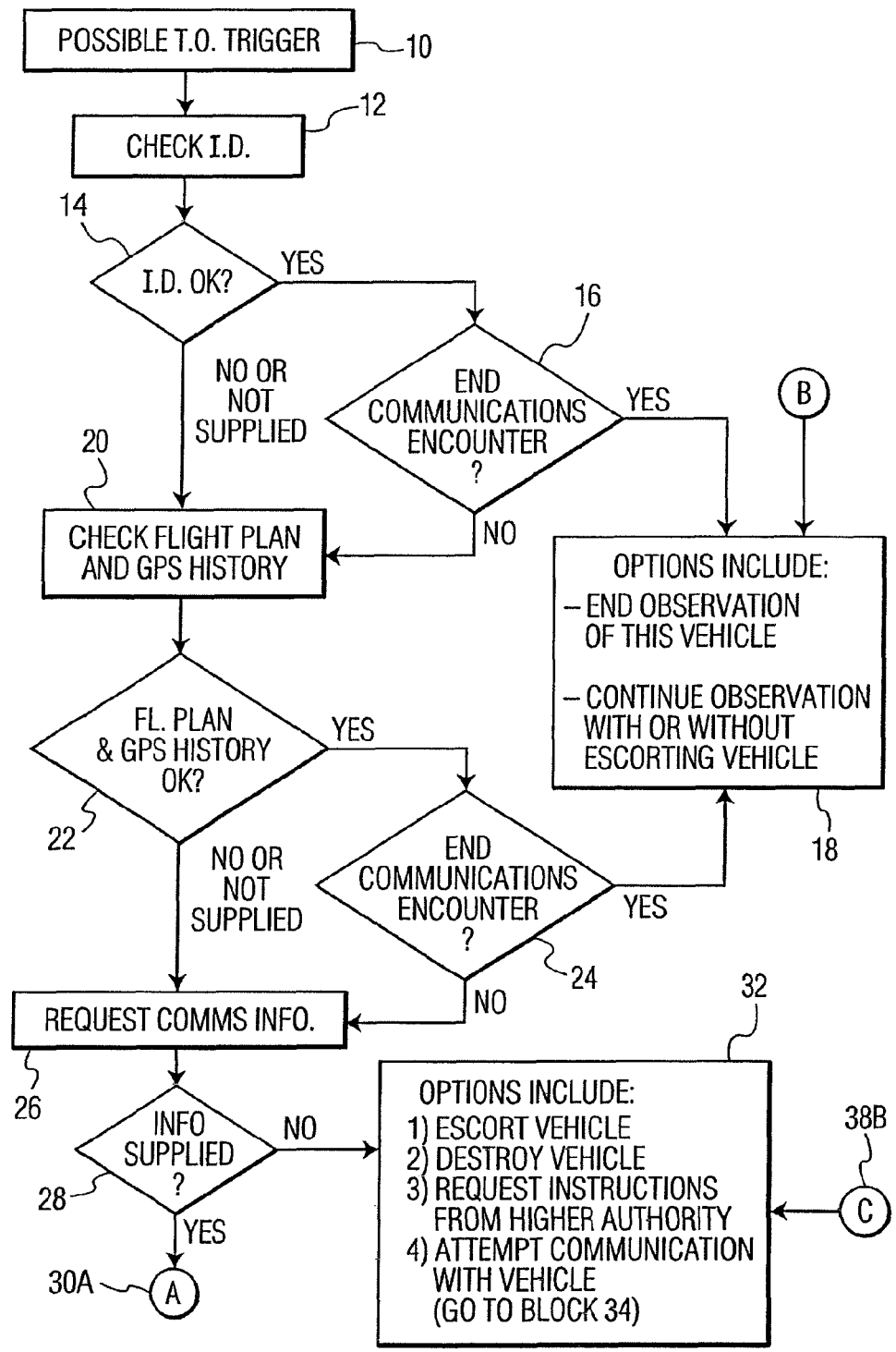
Figure 1B:
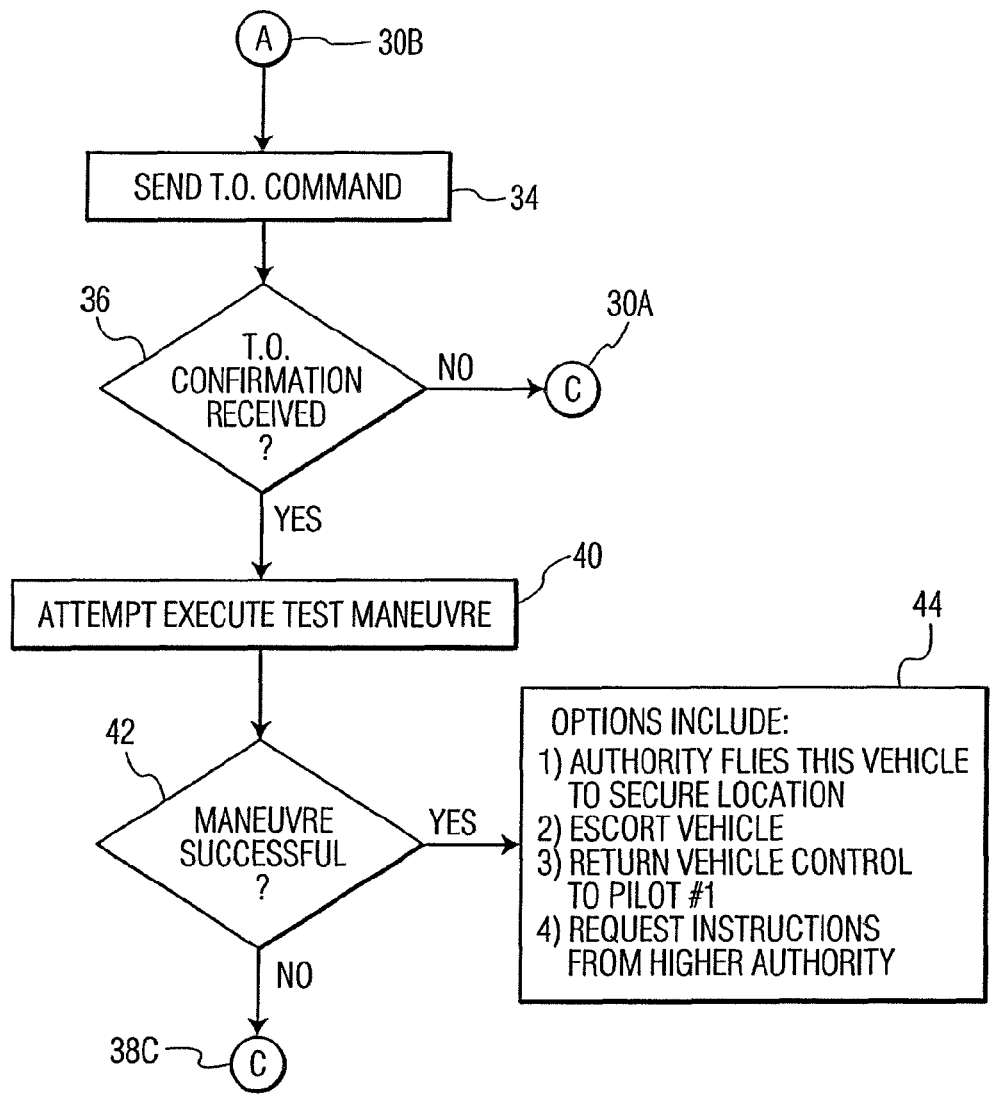

FIG. 1 consists of FIG. 1A and FIG. 1B, and shows an algorithm for policing UAs. The algorithm begins with block 10, an indication of a possibly improper UA. The basis of the impropriety could be:

a) information provided to a policing authority (PA) from one of many possible sources of security information;

b) information from a computer (or person who operates the computer), which tracks the position of UAs;
c) information from a computer (or person who operates the computer), which tracks the flight plans of UAs;
d) information from a computer (or person who operates the computer), which compares the positions and flight plans of UAs; and
e) GPS or radar or other sighting information (from a ground-based, sea-based, air-based or space-based observer or observation apparatus, indicating encroachment of a UA into a sensitive space.

"Possible T.O. Trigger" 10 indicates an indication, such as listed hereinabove, for possible takeover (TO) of the UA. The takeover would result in
a) removal of the UA pilot (first pilot herein) control; and
b) institution of control by either a local or remote pilot (second pilot) who is part of a PA.

In one embodiment of the invention, the first pilot PA checks the identification of the UA, block 12. The check could entail any one of a variety of methods known in the art, including:
a) interrogating an identifying device aboard the UA; and
b) observing the exterior of the UA, which may include:
   i) identifying alphanumeric or other surface based pattern, using visible light;
   ii) using a laser to identify coded paint, as is known in the art.

The interrogation of the identifying device, above, may take place by radiofrequency communication on a channel which has been designated specifically for the purpose of UA identification (ID) and policing. If one or more such channels are allocated, the PA may need to attempt communication on each such channel. The ideal situation would be statutory requirement that every UA (or almost every UA) be outfitted with equipment which allows communication on a known, agreed upon channel, using an agreed upon communication protocol known to at least the PA and the UA operator.

At block 14, the PA determines if the ID is acceptable. Such determination may be based on:
a) a list, appropriately disseminated, of properly registered UAs; and/or
b) a list, appropriately disseminated, of UAs which are on a "watch list," indicating the potential for inappropriate UA behavior.

If the ID is acceptable, block 16, the PA:
a) may end the communication encounter, in which case the PA options, block 18, would be:
   i) ending the observation of this particular UA; or
   ii) continuing observation (with some enhancement of the level of surveillance above that of other UAs), with or without escorting the vehicle. If the PA is aboard an aircraft in proximity to the UA, such escorting may begin promptly. If the PA is not in proximity to the UA, escorting may consist of dispatching a chase aircraft which flies to the location of the UA and stays in proximity until there is no longer any need for escort.

If the identification is unsatisfactory, or if—at block 16—the PA chooses not to end the communications encounter with the UA, the PA, block 20, may request one or more of:
a) a UA flight plan;
b) the UA GPS history (i.e. a history of each previous location that the UA has been, indicated by space and time coordinates); and
c) a comparison of the UA flight plan and the GPS history, the comparison indicating whether the UA has complied with its flight plan.

Each of a) b), and c) may be stored in a memory unit within the UA, or stored in a ground based facility that tracks UAs, see hereinbelow.

If the PA finds that the flight plan, the GPS history, and/or the comparison of the two is acceptable, then block 22 leads to 24, at which point the PA may choose to end the communications encounter, with options then per block 18, as discussed hereinabove.

If (a) the flight plan/GPS history analysis yields unsatisfactory results, or is not responded to at block 22: or if (b) at block 24 the PA decides that not enough information has been presented to reach a decision about whether the UA flight should be allowed to continue under the control of the first pilot, then, at block 26, the PA requests communications information from the UA. This information may include one or more of:
a) the frequency or channel on which the UA transmits telemetry to the UA pilot;
b) the frequency or channel on which the UA receives commands from the UA pilot;
c) the system or methodology that the UA and the UA pilot use for channel hopping;
d) the system or methodology that the UA and the UA pilot use for encoding and decoding exchanged information;
e) the system or methodology that the UA and the UA pilot use for encrypting and decrypting exchanged information;
f) passwords, if any; and
g) any other communication formatting or executing information necessary for the PA pilot to fly the UA.

The step of requesting the communications information may come earlier in the algorithm shown in FIG. 1. It may come between blocks 10 and 12, or it may come immediately before block 20. Furthermore, the request for information may be from another UA or the pilot of another UA.

If the requested information is not supplied, block 28 to block 32, the PA options include:
a) escorting the UA (with the option of more aggressive action at a later time);
b) destroying the UA;
c) requesting instructions from a higher authority; and
d) attempting communication with the UA; If this leads to establishment of a working communications link, the algorithm proceeds as described hereinbelow for block 34; If this does not lead to a working link, options a), b) and c) remain as choices.

The attempt d) may entail a trial-and-error effort to determine the needed communication parameters, or may entail use of information stored in a database.

The PA may skip to the options listed in block 32 if an unsatisfactory result occurs at the time of either ID checking or the assessment of flight plan and/or GPS history.

If the requested communication information is supplied, block 28 to 30A to 30B (FIG. 1A, and continuing on FIG. 1B) to 34, the PA sends a takeover command to the UA. In one preferred embodiment of the invention, the takeover (TO) command causes
a) the UA to allow piloting by the PA;
b) the UA to exclude piloting by the UA pilot (the first pilot); and
c) the UA to send a confirmation signal that the TO command has been executed. Apparatus which allows for the execution of such a commands is presented hereinbelow.

In other embodiments of the invention:
a) there may not be a TO confirmation signal;
b) there may not be a lockout of the first pilot from control; and c) there may not be a unique TO command; Rather, specific commands (e.g. move rudder by a specific amount) would be sent to the UA.

Referring again to the embodiment in which a confirmation signal is sent when a TO command is enacted, if the TO confirmation is not received following the transmission of a TO command, block 34 to 36 to 38A to 38B (FIG. 1A) to 32 with options including: include:

a) escorting the UA (with the option of more aggressive action at a later time);
b) destroying the UA;
c) requesting instructions from a higher authority; and
d) again transmitting a TO command.

If a TO confirmation signal is received, block 34 leads to 36 and then to 40, at which time the PA may attempt to execute a test maneuver. The test maneuver is the transmission of a command which causes a change in aircraft attitude which may either be directly observed by a local PA (e.g. bank five degrees), or may be detected by apparatus onboard the UA (see below).

The purpose of the maneuver is to attempt to distinguish ill-intentioned UA pilots/vehicles from those with benign intentions; The assumption is that an ill-intentioned UA pilot would be much less likely to comply with a request to allow takeover of the UA by the PA. (Though it may be the case that an ill-intentioned UA pilot would not allow for the transmission of information requested in blocks 12, 20 and 26, such denials are dealt with by the algorithm [and lead to block 32].) It may be that an ill-intentioned pilot would have allowed the transmission of information at blocks 12, 20 and 26 hoping to avoid detection.

If the test maneuver is not executed successfully, block 40 leads to 42, then to 38C and then to 38B (in FIG. 1A), with PA options including:

a) escorting the UA (with the option of more aggressive action at a later time);
b) destroying the UA;
c) requesting instructions from a higher authority; and
d) again transmitting a test maneuver.

If the test maneuver is successful (indicating that the PA is indeed capable, at this point, of piloting the UA) then block 40 leads to 42, and then to 44 with PA options including:

a) the PA, now in control of the UA, flying the vehicle to a more secure location;
b) escorting the UA (with the option of more aggressive action at a later time);
c) returning control of the vehicle to the first (i.e. UA) pilot;
d) requesting instructions from a higher authority.

The reasoning behind option c) is that if the first pilot permitted each of the aforementioned steps/requests by the PA, the likelihood of his being an ill-intentioned pilot is substantially decreased, compared to the pre-evaluation likelihood.

Figure 2:
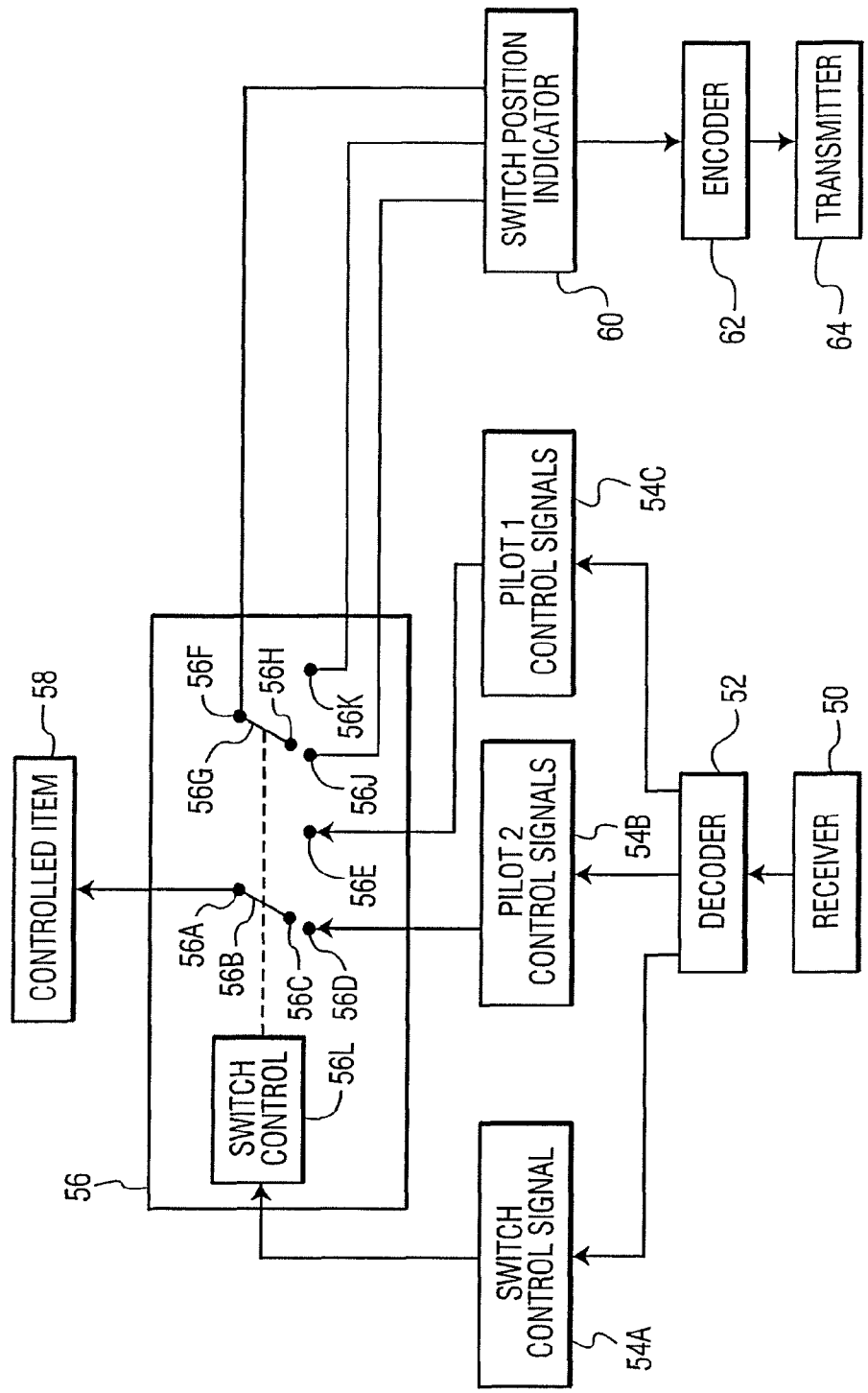
FIG. 2 shows a block diagram for determining the source of control of a UA.

FIG. 2 shows a form of apparatus which may be aboard a UA which allows for the aforementioned tasks including the transfer of control from the first pilot to the PA following a TO signal, and the transmission of a TO confirmation. The switching apparatus shown is intended to be viewed schematically; though an "old technology" double-pole-double-throw relay may accomplish the task of switching control from the UA pilot (also referred to herein as "pilot 1") to the PA (also referred to as "pilot 2"), more sophisticated switching arrangements, including computer hardware and/or software based approaches, are possible and are known in the art.

In the figure, signals to the UA are received by 50, and decoded (and decrypted, as necessary) by 52. Under ordinary circumstances, the UA first pilot control signals 54C pass to the appropriate item to be controlled 58 (e.g. rudder, throttles etc.) via the path 54C to 56E to 56C to 56B to 56A to 58. (The poles in the figure are shown in the other position, i.e. allowing control by the PA pilot.)

When the PA wishes to take control of the aircraft, a switch control signal is sent along the path 50 to 52 to 54A to 56L. Switch control 56L causes the two components of the switch to move to the pilot 2/PA pilot (i.e. the left-most position in the figure). The result is that pilot 1 control signals can no longer pass beyond 56E, and that pilot 2 signals control items 58 along the path 50 to 52 to 54B to 56D to 56C to 56B to 56A to 58. If, at a later time, the PA is satisfied that control of the UA can safely be returned to the first pilot (option 3 in block 44 of FIG. 1B), a switch control signal sent to 54A restores control to the first pilot.

The switch components 56F, 56G, 56H, 56J and 56K allow the PA to know the switch position: Switch position indicator 60 senses which of two positions the switch is in, via 56F-56K, the information is encoded and preferably encrypted at 62 and transmitted to the PA by 64.

Figure 3:
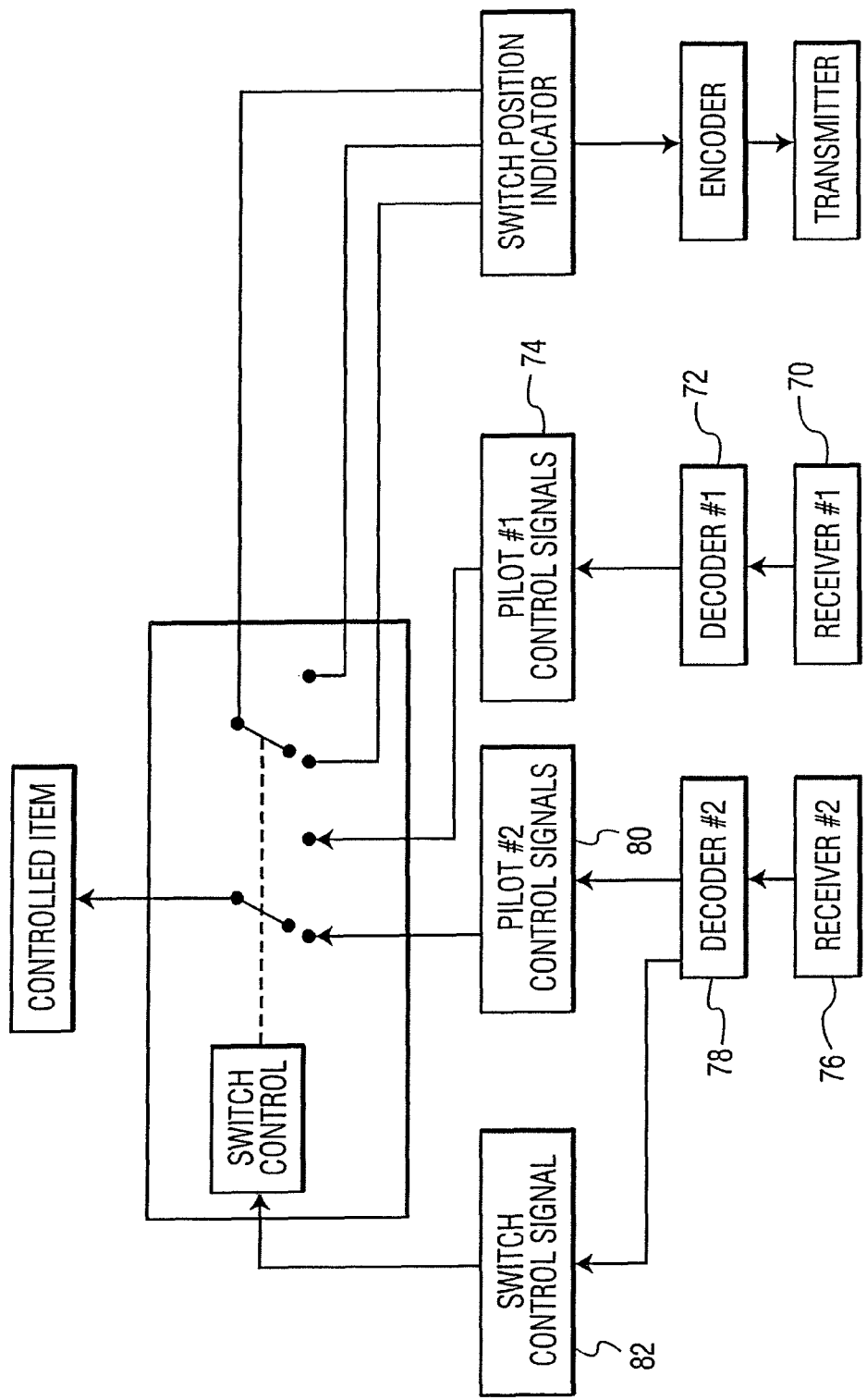
FIG. 3 shows another block diagram for determining the source of control of a UA.

An alternate embodiment of the switching arrangement is shown in FIG. 3. FIG. 3 differs from FIG. 2 only in that FIG. 3 contain separate receiver/decoder elements for the pilot #1 signals and for the pilot #2 signals. One way of limiting the chance that an unauthorized person/hacker could usurp the authority of the PA and attempt to obtain control over a UA would be to use one or more of:

a) high output transmitters for PA control signals;
b) low sensitivity receivers for PA control signals;
c) highly directional antennae at each end of the PA-UA communication link;
d) upwardly oriented UA antennae, to communicate with a PA aircraft located at a higher altitude than the UA (This might require an antenna for UAV-PA communication which is separate than the one for UA-first pilot communications. [The separate antenna is not shown in the figure.]; and
e) time dependent varying of the orientation of either the PA antenna or the UA antenna (with corresponding adjustments by the PA pilot to compensate for such orientation changes).

In addition, the aforementioned unauthorized controller exclusion would employ encoding and encryption techniques as are known in the art.

Referring again to FIG. 3, first pilot signals are received along the path 70 to 72 to 74. PA pilot signals are received by a low sensitivity receiver 76, decoded by 78, thereby giving rise to pilot #2 (PA pilot) control signals 80 and pilot #2 switch control signals 82. Embodiments of the invention with two receivers (70 and 76) and a single decoder are possible. Embodiments of the invention which share not only a decoder but which also share all but the "front end" of the receiver are possible.

Figure 4:
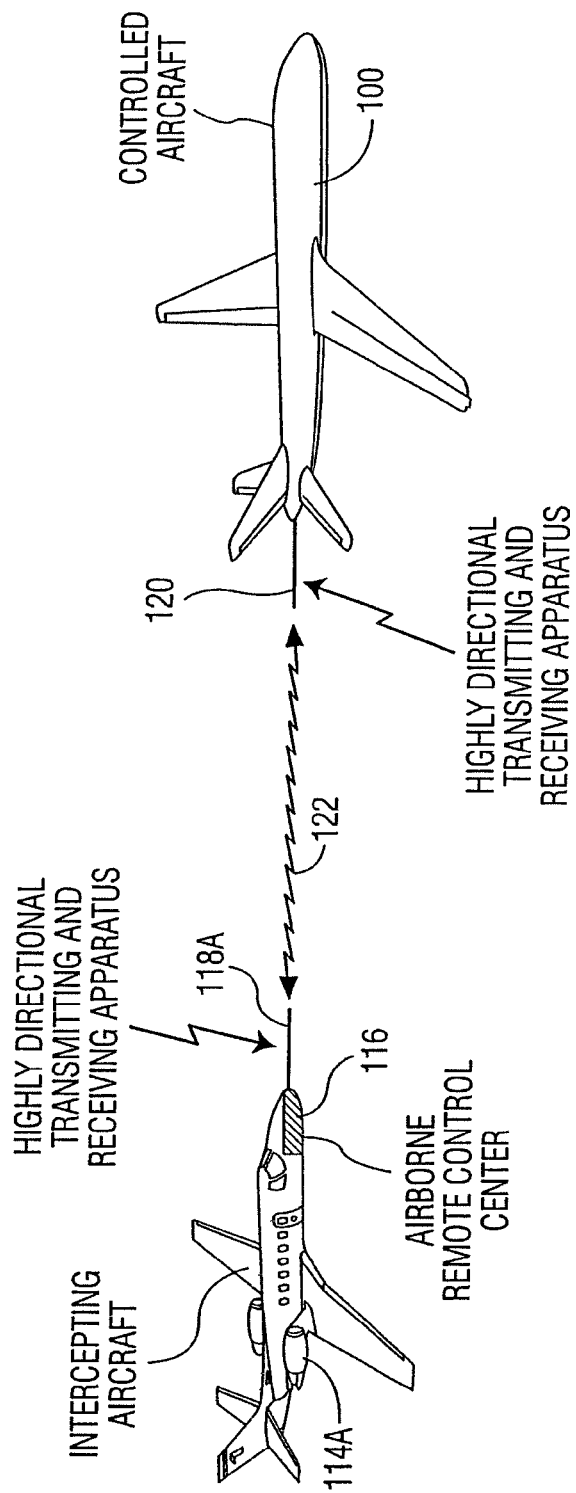
FIG. 4 shows a system of highly directional transmission between a UA and an aircraft for policing UAs.

FIG. 4 shows the use of highly directional apparatus aboard the UA 100 and a PA aircraft 114A. Control signals 122 are sent from an airborne remote control center 116 via directional antenna 118A aboard 114A to directional antenna 120. Directional apparatus may also be for transmission from 100 to 114A.

Figure 5:
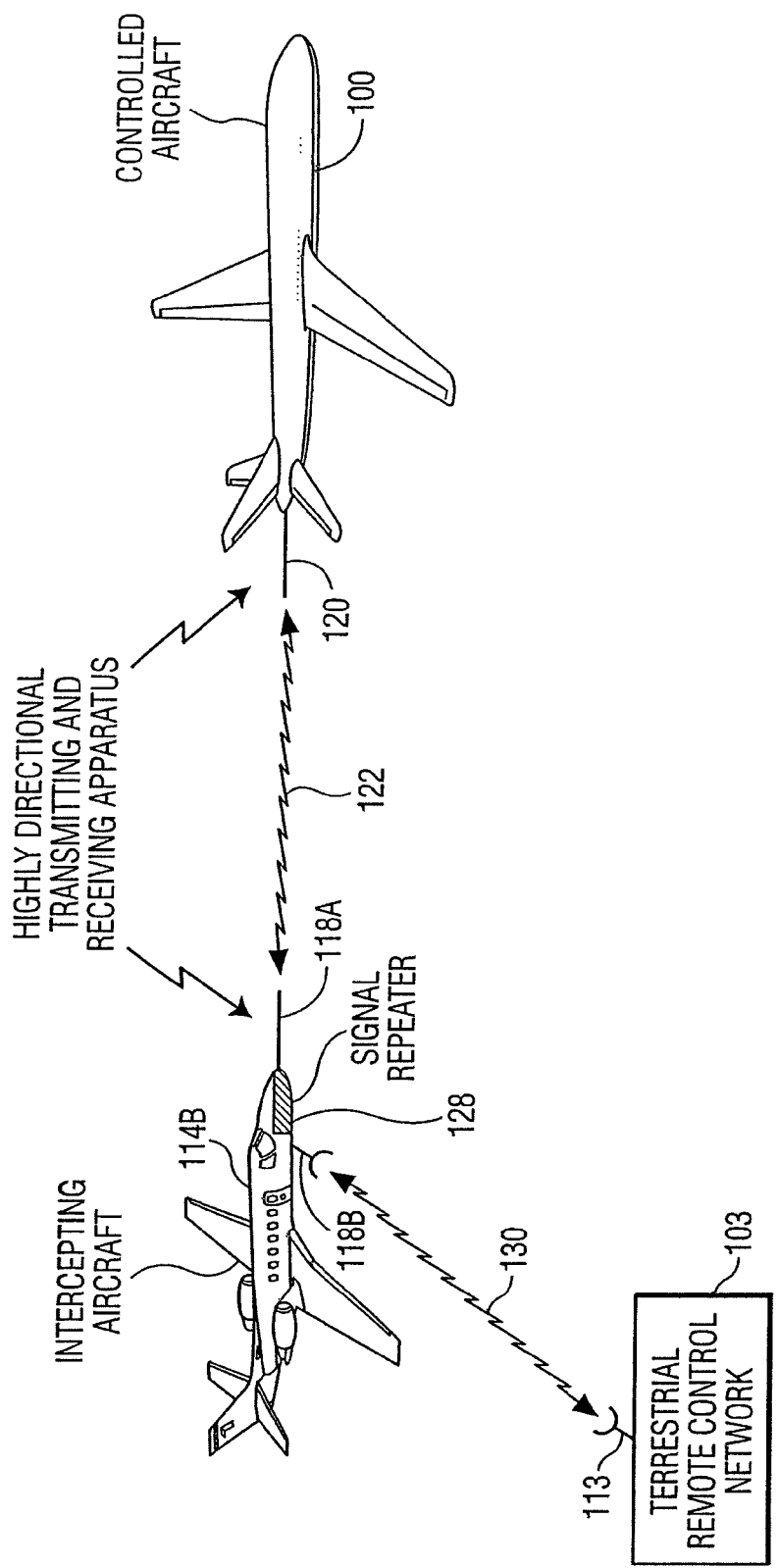
FIG. 5 shows another system of highly directional transmission between a UA and an aircraft for policing UAs, which includes a terrestrial station.

FIG. 5 shows an embodiment of the invention in which an intercepting aircraft 114B acts as a repeater unit, allow a terrestrial (land or sea-based) remote control network 103 to control a UA 100. Signals to the UA traverse the path 103 to 113 to 118B to 128 (signal repeater equipment) to 118A giving rise to signals 122 to 120 to 100. (The reversed sequence pertains to telemetry and other signals from 100 to 103.) Antennae 113 and 118B would be operative to vary their orientation to optimize signal strength based on the positions of 103 and 114B.

Figure 6:
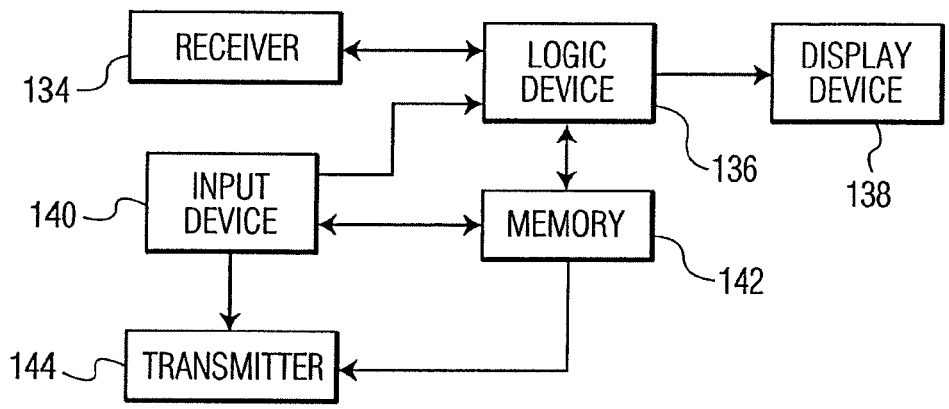
FIG. 6 shows a block diagram of apparatus for policing UAs.

FIG. 6 shows apparatus which comprises a preferred embodiment of the PA apparatus for communicating with a UA. The PA inputs commands via input device 140, which are transmitted by 144. The PA receives UA signals via 134 which may be linked directly to display device 138, or to 138 via logic device 136. 136 allows for the comparison, if desired by the PA, of GPS history and intended flight plans. The flight plans may be stored in memory 142 or received at the time that the GPS history is received. 142 may also store a list of potentially problematic UAVs, i.e. UAVs to be watched more carefully than others. 142 may also store flight routines which allow a PA pilot to fly a UA to a specific destination with a minimum of control activity; 140 may input the control signals which allow for these flight routines to go directly to 144, or to go to 144 from 142. 142 may also serve to record all PA actions that issue from 140. The combination of 136 and 142 may act as a flight management computer and/or autopilot for the UA when it is controlled by the PA who provides input via 140.

Figure 7:
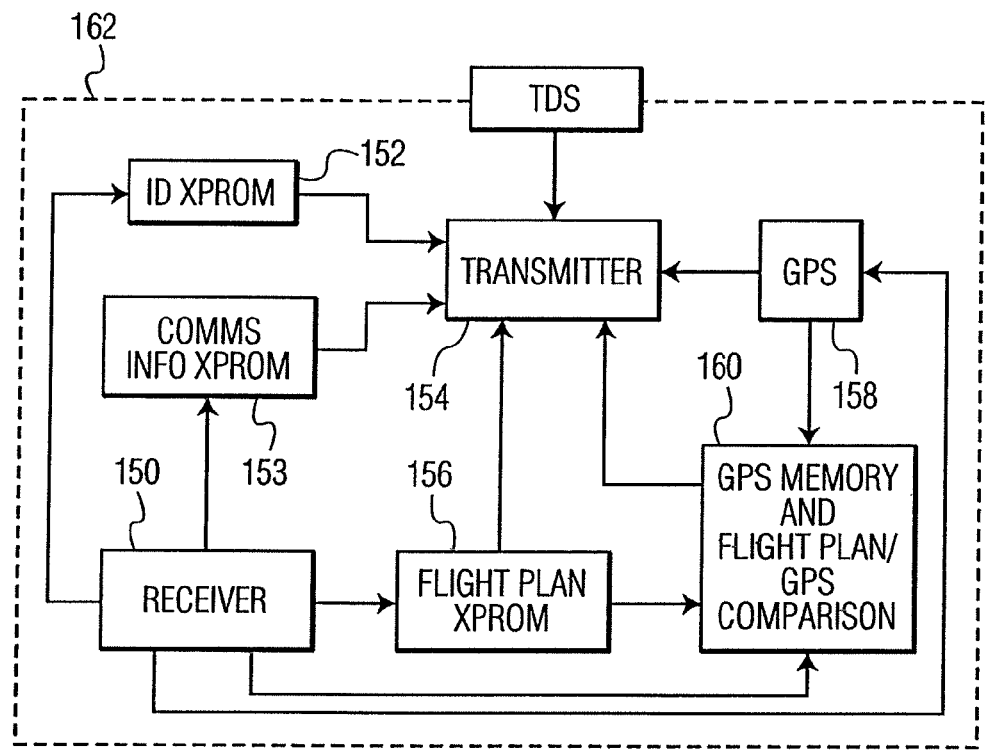
FIG. 7 shows a block diagram of apparatus aboard a UA which allows it to be policed.

FIG. 7 shows a system aboard the UA which communicates with that of the system shown in FIG. 6. The system in FIG. 7 contains
receiver 150, which,
1) on receipt of a suitable signal, 150 causes identification XPROM 152 (which is either a PROM, an EPROM, an EEPROM or similar write-once-only-memory device as is known in the art) to signal transmitter 154 (and/or causes transmitter 154 to send the UI contained in 152);
2) on receipt of another type of signal, and of flight plan information, causes the writing of flight plan information into flight plan XPROM 156;
3) on receipt of another type of signal, causes the transmission of flight plan information from 156 to 154 to the PA;
4) on receipt of another type of signal, causes the transmission of communications information from XPROM 153 to 154 to the PA;
5) on receipt of another type of signal, causes the transmission of real-time GPS information from 158 to 154 and then to the UA;
6) on receipt of another type of signal, causes the transmission of either:
   i) GPS history stored in 160, to 154, to the PA;
   ii) a comparison of the GPS history stored in 160 and the flight plan information, to 154, to the PA.

160 may be a computer, part of a computer, a microprocessor, part of a microprocessor or a logic device or system of logic devices as is known in the art. GPS or other locator system information may be:
a) transmitted to a remote control center (RCC);
b) used as a basis for assessing compliance with the flight plan. The GPS data may be used to generate both the expected UA position and the expected UA velocity.

160 may cause the transmission of:
a) all "raw data" related to the comparison of GPS data and the flight plan;
b) only the results of such comparisons that indicate significant deviation from the flight plan.

In a preferred embodiment of the invention, the apparatus consisting of elements 150 through 160 is enclosed within tamper detecting seal (TDS) 162.

Figure 8:
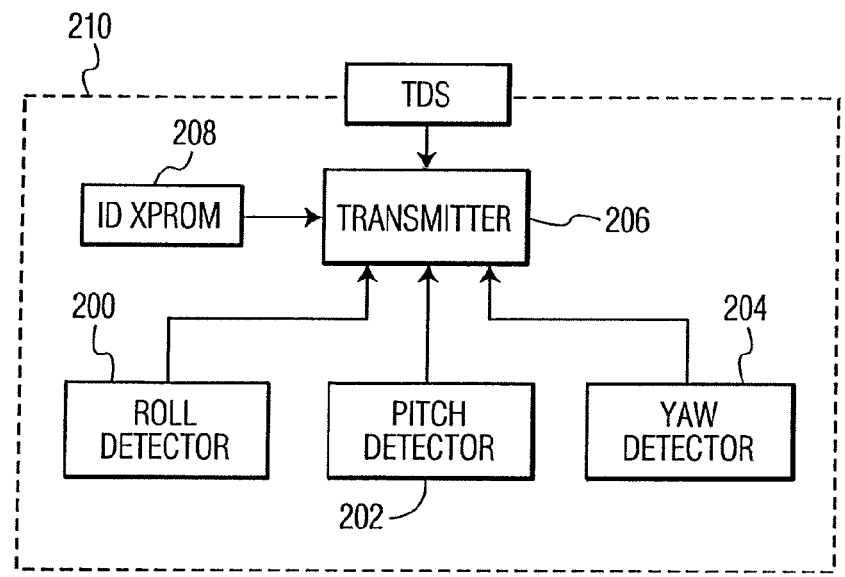
FIG. 8 shows a block diagram of apparatus aboard a UA which allows the assessment of its response to a policing authority command.

FIG. 8 shows apparatus aboard the UA which allows the RCC to determine if a test command sent by it has been received and executed. Not shown in the figure is:

a) the receiver which receives the command;
b) the aircraft apparatus which carries out the command; and
c) the linkage between a) and b).

If and when the command is executed, one of roll detector 200, pitch detector 202 or yaw detector 204 will register a change in sensed input corresponding to which of these was associated with the test command. (Other test commands are possible.) The output of these detectors is transmitted at 206. In a preferred embodiment of the invention, the transmission is accompanied by a UI from XPROM 208. In a preferred embodiment of the invention, the apparatus comprising elements 200-208 is enclosed in TDS 210.

Figure 9:
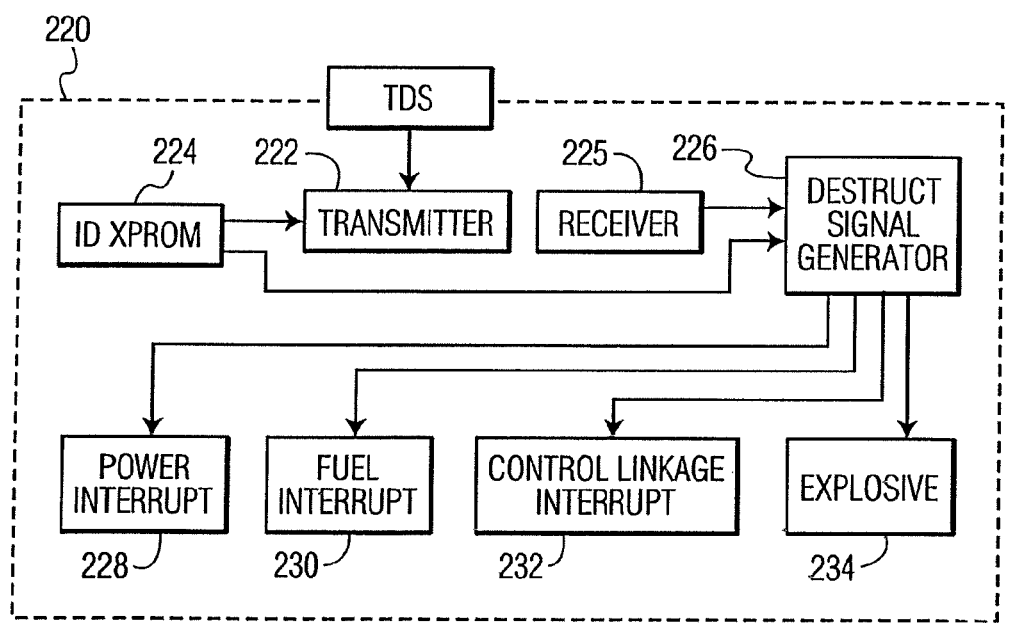
FIG. 9 shows a block diagram of apparatus aboard a UA which allows its destruction, if appropriately commanded.

FIG. 9 shows an apparatus which allows remotely triggered destruction of a UA. The apparatus is enclosed in TDS 220. Transmitter 222 confirms the identity of the UA with a UI from 224. In the event that an authorized person determines that it is not appropriate for the UA to continue its flight, and in the event that such authorized person does not wish to or cannot take control of the UA as a second pilot and fly it to an appropriate destination, the authorized person would have the option of destroying or incapacitating the UA using apparatus aboard the UA shown in the figure.

If the authorized person makes a destruct decision, a destruct signal, "DS" is sent. The DS is received by 225, from which, after appropriate decoding and decryption, a destruct signal is generated, indicated by element 226. Four options for executing such destruction are illustrated in the figure:
a) 228, indicating apparatus for interrupting electrical power distribution to critical elements within the UA;
b) 230, indicating apparatus for the interruption of fuel flow within the UA;
c) 232, indicating apparatus for interrupting the linkage to moving aircraft control elements (throttle, rudder, ailerons, flaps, etc.); and
d) 234, indicating one or more explosive charges carried by the UA, which may be detonated in response to a signal 226.

Figure 10:
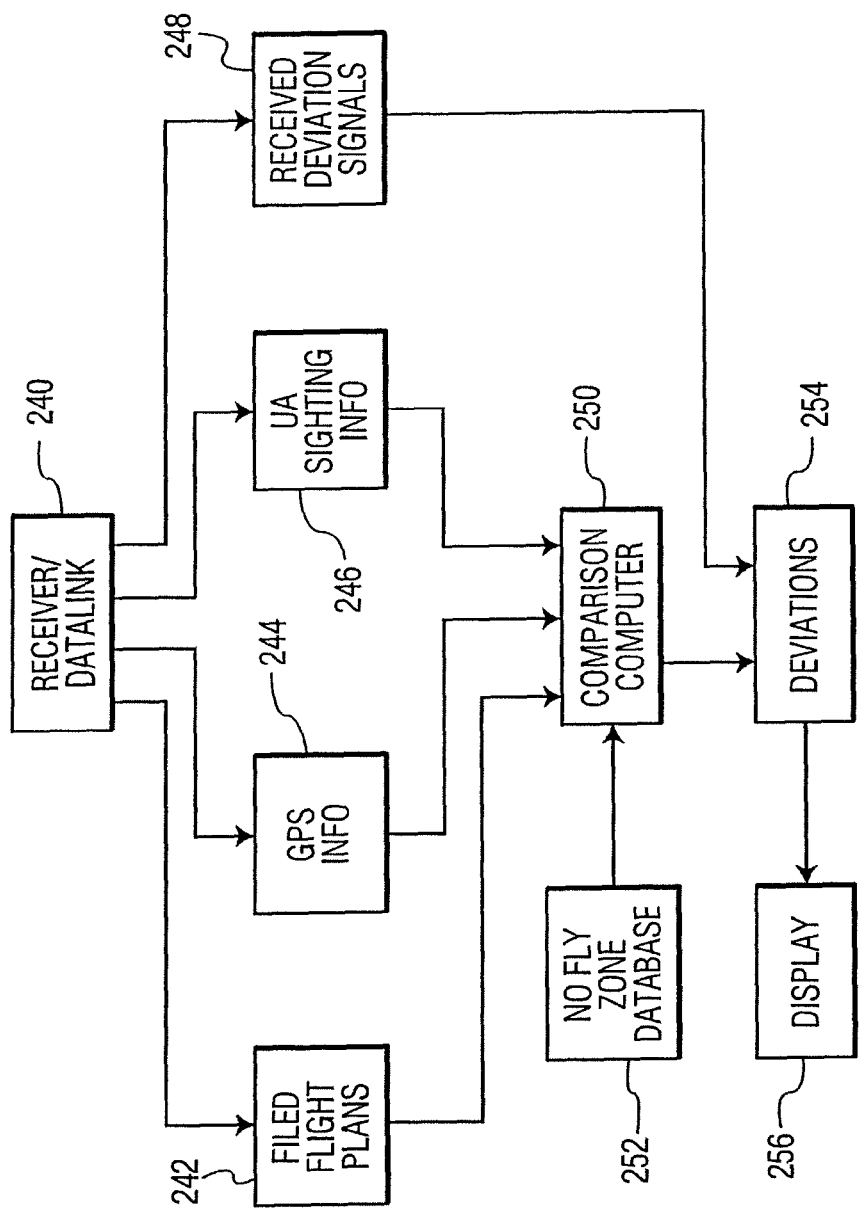
FIG. 10 shows apparatus to be used by a policing authority, for identifying UAs which may need assessment, because of potential, possible or actual inappropriate behavior by the UA.

FIG. 10 shows apparatus with which a remote control center (either terrestrial or airborne) may determine whether UA location and/or UA flight plans are appropriate. Receiver or datalink 240 receives four types of information:
a) filed flight plans 242;
b) GPS information 244, transmitted from GPS apparatus aboard UAs;
c) UA sighting information 246 (e.g. other aircraft reporting on the presence of a particular UA at a particular time and location); and
d) deviation signals 248 (such as those generated by element 160 in FIG. 7).

Comparison computer microprocessor/logic system 250 compares:
a) actual UA position information from 244 and 246 with expected UA position information from 242;
b) actual UA position information with known "no-fly" zones (stored in database 252); and
c) filed flight plans with no-fly locations.

254, i.e. (A) 248, and (B) the output of 250, indicating any of the three types of aforementioned deviations are displayed by 256. In a preferred embodiment of the invention, the display may also indicate one or more of:
a) the UI of the deviated UA;
b) the magnitude of the deviation;
c) historical information about the flight: i.e. details about the portions of the flight, if any, prior to the deviation;

d) historical information about the particular UA including:
   1) prior flights; and
   2) the owner; and
e) enroute weather information for the UA, as a possible explanation for an off-course location.

The airspace may be patrolled for inappropriate UA activity by:
a) existing patrol networks;
b) one or many unmanned aircraft for the specific purpose of policing UAs;
c) one or many manned aircraft whose primary purpose is either passenger/commercial or military, but which may be outfitted with UA policing equipment; and
d) combinations of a), b) and c).

Each of FIGS. 11-15E refers to an unmanned vehicle ("UV") system which is policed for inappropriate action by the pilot or the vehicle. Such UVs may be air vehicles, ground vehicles, underwater vehicles or space vehicles. For convenience, in each case, the person who is the primary controller of the vehicle is referred to as the "pilot," while the person or device which monitors and, if necessary, takes control away from the pilot is referred to as the "police," or "police person."

The police may be any monitoring agency. The term police is intended in a generic sense, and may include law enforcement, private monitoring and enforcement organizations, and teaching entities (who teach new pilots to operate UVs).

Although the specific type telemetry signals sent to the pilot(s), and control signals sent to the UV will depend on whether the particular type of vehicle, the system concepts and apparatus interactions are largely independent of whether the vehicle is an air vehicle, a ground vehicle, a space vehicle, an underwater vehicle, or a vehicle capable of navigating more than one of such media.

Figure 11:
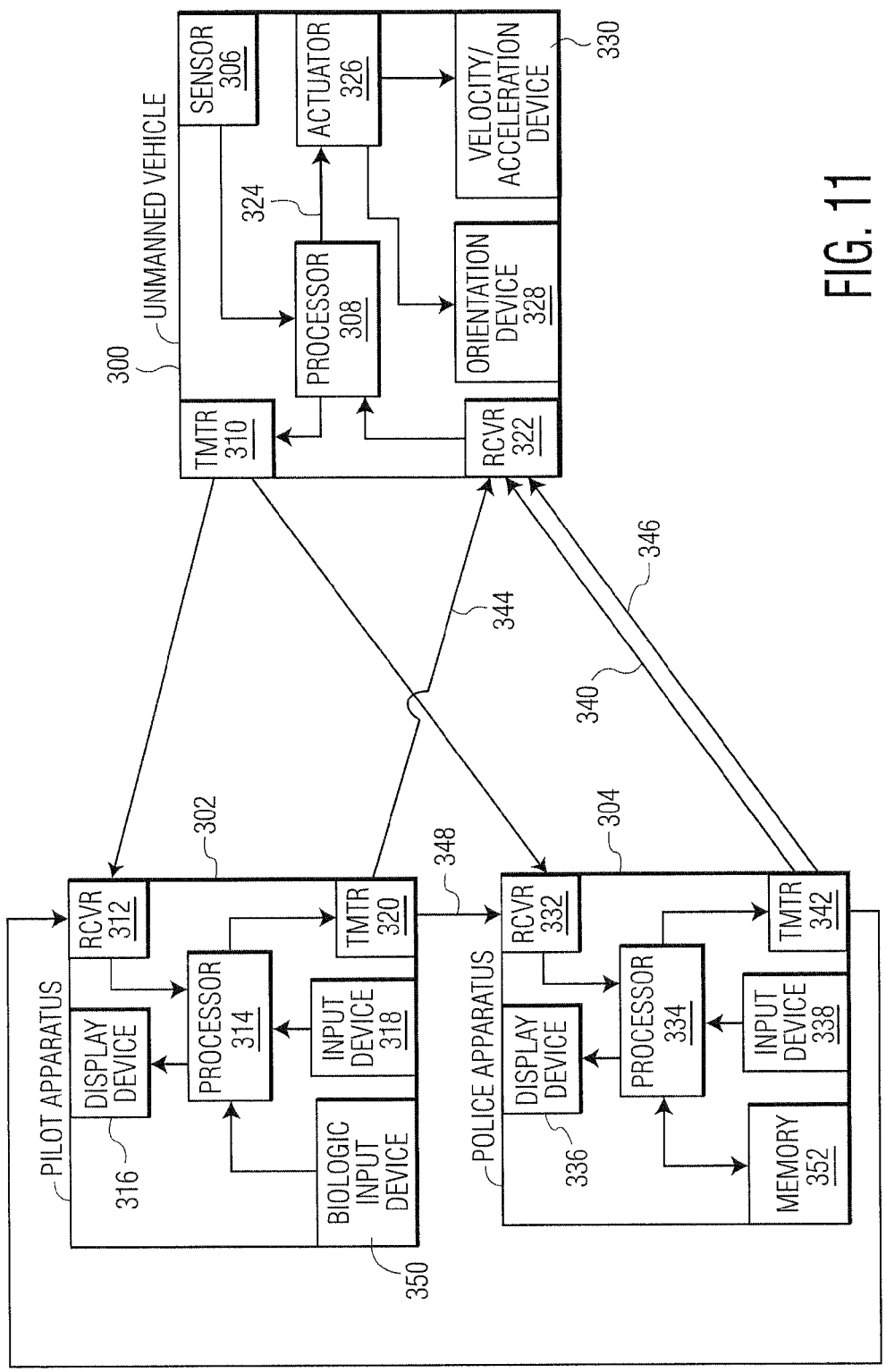
FIG. 11 shows a block diagram of an unmanned vehicle system with two sources of control and with three operating states.

FIG. 11 shows an unmanned vehicle system in which UV 300 is controlled by pilot apparatus 302. The pilot receives vehicle data signals via the route vehicle sensor 306 to vehicle processor 308 to vehicle transmitting device 310, to pilot receiving device 312 to pilot processor 314, after which the sensor information is available for display by device 316. In the case of an aircraft such data includes but is not limited to GPS information, airspeed, horizontal velocity, vertical velocity, roll, pitch, yaw information, derivatives of each of the aforesaid. The pilot inputs commands to control the vehicle to input device 318. The inputted commands are passed to the vehicle along the route 318 to processor 314 to transmitting device 320 to vehicle receiving device 322 to processor 308. The processor provides actuator control signals 324 for actuators 326, which control various vehicle control devices as are known in the art. Such control devices include but are not limited to devices which control the orientation of a vehicle 328 (e.g. steering apparatus in a ground vehicle, a rudder in an air or underwater vehicle, steering jets in a space vehicle, etc.); and devices which control the velocity and acceleration of a vehicle 330 (e.g. throttles in a hydrocarbon burning propulsion system, voltage of an electric engine whose speed is voltage dependent, etc.).

Vehicle 300 is monitored by police apparatus 304 for inappropriate actions which may be caused (a) intentionally by the pilot, (b) unintentionally by the pilot, (c) by vehicle malfunction, or (d) due to problematic interaction with another vehicle. This police monitoring is accomplished in a manner which is analogous to that by which information reaches the pilot: Telemetry signals from vehicle sensors 306 provide information along the path 306 to vehicle processor 308, to vehicle transmitting device 310 to police receiving device to police processor 334 to police display device 336. In one embodiment of the invention, a police person observes the display (and may observe one or more other vehicle information displays), and, if necessary inputs commands via input device 338 to (a) take control of the vehicle away from the pilot, and (b) control the vehicle from apparatus 304. In another embodiment of the invention, processor 334 may perform such function without human intervention. In yet another embodiment, both human and processor analysis and/or decision making occurs. The commands to control the motion of the vehicle are transmitted as signals 340 by police transmitting device 342 to vehicle receiving device 332, and thence traverse the same path as did signals 344 from device 302.

The vehicle processor is operative to receive another control signal 346 from the police unit which determines the source of control of the UV. The control input which accompanies this is inputted at 338 (which may be a single input device or, in a preferred embodiment of the invention, is a plurality of input devices).

There are three control scenarios, and the choice of control scenario is determined by signal 346:
  (1) vehicle instructions 344 from pilot unit 302 control the UV,
  (2) vehicle instructions 340 from police unit 304 control the UV, and
  (3) vehicle instructions 348 from pilot unit 302 are passed to police unit 304, and, if continuing access to UV control by 302 is allowed, these instructions are passed on to the UV. The route for such signals in this third scenario is 318 to 314 to 320 to 332 (as signals 348) to 334 to 342 to 322 (as signals 340).

Scenario (3) is a probationary one for the pilot/UV. In the event that there is a high level of concern that a police intervention will be necessary, and/or when an additional degree of isolation of the pilot from the UV is desirable, then control scenario (3) may be selected. For example, in the case of intermittent malfunction of processor 308, by allowing the pilot control interruption to take place at the police unit, scenario (3) offers additional opportunity for interrupting pilot control than that available by intervening at processor 308.

Other approaches to manipulating pilot access include the control of pilot access to vehicle telemetry signals. The figure shows a direct link between 310 and 312, but embodiments of the invention in which control of these signals is routed through the police unit are possible. Scenarios in which processor 308 is operative to lockout telemetry signal transmission to unit 302 are possible.

In the event that additional verification of who is piloting the vehicle is required, the pilot may input biologic information to 350 such as a fingerprint, an image of a face, a palm, a voiceprint, an iris, and a retina are possible, as is a DNA sample, and other biologic identification techniques as are known in the art. The biologic information is passed to the police unit for comparison with a database containing biologic information of certified pilots 352. The comparison of the stored and received biologic information may be performed by processor 334 or by a person observing 336.

If the UV is action, or pilot are deemed to be inappropriate, threatening or dangerous, the police have a variety of options including notification of various authorities. They may also be equipped with a weapon device which can disable or destroy the UV. The inclusion of such apparatus is applicable to each of the embodiments of the invention discussed hereinbelow.

Figure 12:
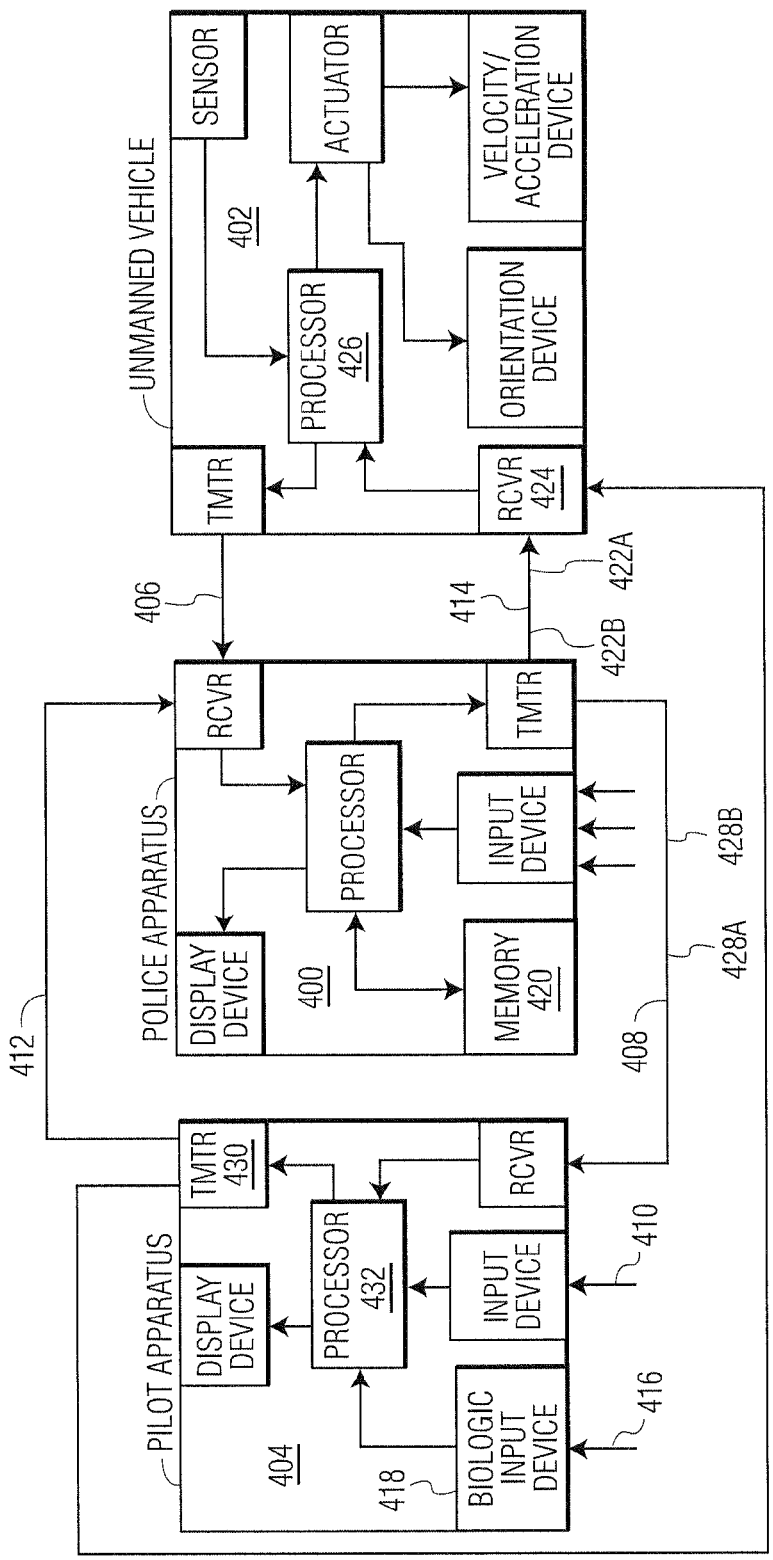
FIG. 12 shows a block diagram of an unmanned vehicle system with a police unit interposed between the pilot and the vehicle.

FIG. 12 shows an embodiment of the invention in which police apparatus 400 is interposed between UV 402 and pilot 404. Vehicle telemetry signals to the pilot (406, 408) must pass through the police apparatus 400, and may be interrupted by the police apparatus if necessary. Pilot signals which control the UV (410, 412, 414) must also traverse the police apparatus, and may thus be interrupted if deemed necessary.

Biologic identification 416, as discussed hereinabove and hereinbelow may be inputted to device 418, transmitted to the police, and compared with certified and/or registered pilots whose information is stored in 420.

In the event that at some point the pilot and the UV are deemed to be sufficiently reliable that police monitoring is no longer appropriate, in one embodiment of the invention, the police may alter the control scenario so that the pilot may directly communicate with the UV. This may be accomplished by:

- a) sending a signal 422A which alters UV receiver 424 characteristics so that the receiver is operative to receive signals from 404;
- b) sending a signal 422B which alters UV processor 426 characteristics so that the processor is operative to process signals from 404;
- c) sending a signal 428A which causes pilot processor 432 to alters pilot transmitter 430 characteristics so that the receiver 424 is operative to receive signals from 430;
- d) sending a signal 428B which alters pilot processor 432 characteristics so that the processor is operative to process outgoing signals from 404 so that they may be received and processed by the UV;
- e) informing the pilot of various security measures, passwords, identification numbers, secure channel information, etc. that would allow the pilot to directly communicate with the UV; and
- f) combinations of the a)-e).

Having given the pilot direct access, the police may rescind this access at a future time. Signals analogous to the aforementioned a)-d) may accomplish this task, as would altering passwords, ID numbers, etc.

Other techniques for heightening police to UV communication security, as are known in the art, facilitate the accomplishment of the aforementioned tasks including highly directional antennae, frequency hopping, low sensitivity receivers and high output transmitters, schemes for encrypting and encoding as are known in the art. Each of these techniques is applicable to each of the inventions discussed hereinabove and hereinbelow.

The ability to identify exactly who the UV pilot is, is important for safe operation of UVs. As the number of UVs, UV pilots, and UV-using organizations increases over time, this will become increasingly important.

Among the simplest approaches to pilot identification involve the pilot inputting alphanumeric information, e.g. a name, an identification number, a password, etc. But none of these assure that the person inputting the information is the person they claim to be. A higher level of security involves the aforementioned examples of requiring the input of a biologic identifier as well as an alphanumeric one. This allows for a more secure identification, i.e. it allows for the demonstration that the person who is sitting at a pilot control station is properly identified. But even this approach is defeatable, since the imaged person may not be the one actually controlling the UV.

Figure 13:
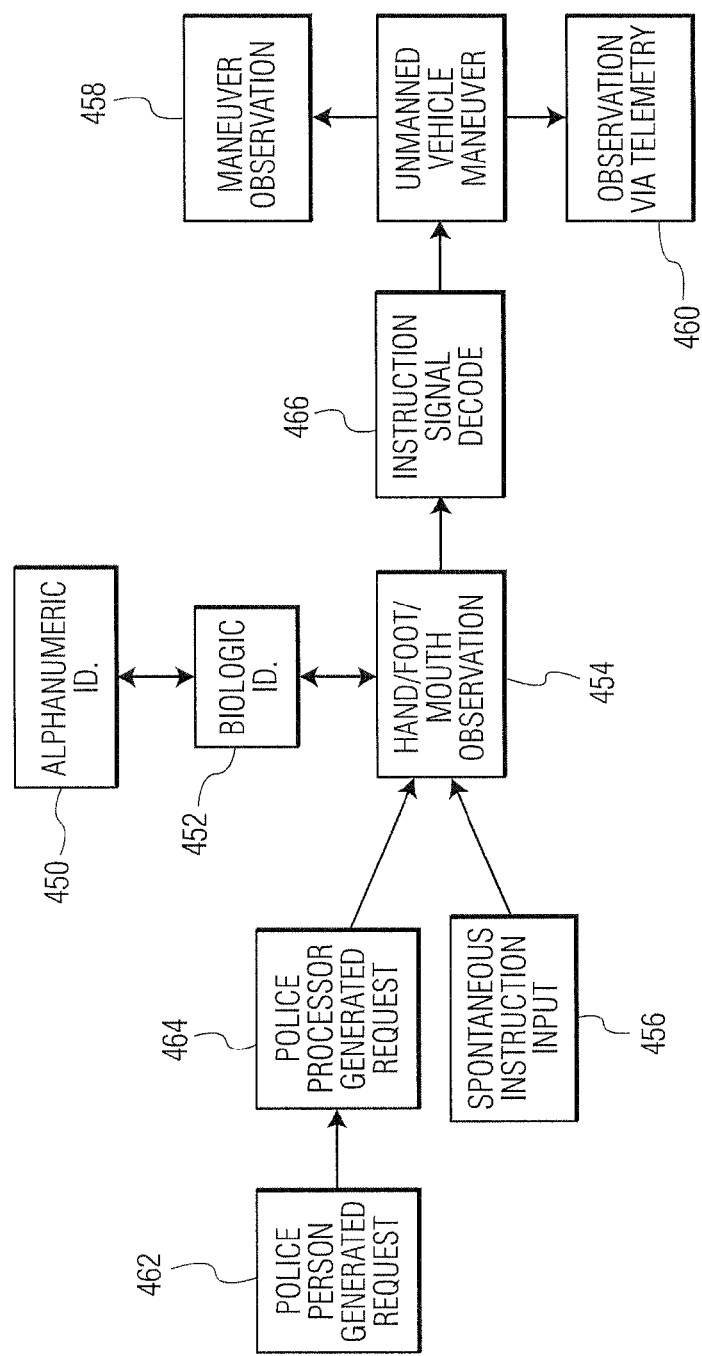
FIG. 13 shows a block diagram of the relationship among biologic identification information, signals which traverse a system for remotely controlling a vehicle, and events involved in the remote control process.

Additional methods, as indicated in FIG. 13, which allow for even greater certainty that the imaged person is controlling the UV entail one or more of:

- a) as indicated by 454: imaging a body part (e.g. the hand) of the pilot as the hand inputs vehicle control commands 456, 462 and 464; this technique is rendered more secure if images which show the body part which inputs the commands also include contiguous body parts which include an identifiable feature (e.g. face, iris, etc.) of the pilot. This matter is the subject of U.S. Pat. No. 8,233,672;
- b) determining the result of the input which was verified as above by observing one or more of (i) the performance 458 of the UV immediately following the inputting of the command, and/or (ii) the outputted signal 466 (e.g. 324 of FIG. 11) at the UV, if accessible. The performance of the UV may be observed directly 458 by a nearby observer, observed indirectly by techniques such as radar, or observed 460 by receiving telemetry signals from the UV sensors that supply the UV pilot with information for flying the vehicle;
- c) providing the UV pilot with a command 462 to be inputted to the UV, and thereafter observing (by any of the techniques in b)) the results. The resulting UV motion, for example, could thus be compared with the police-requested UV motion. The demonstration that the requested motion 462 is similar to or substantially the same as the observed motion following the request 458, 460, along with evidence that a biologically identified person inputted a vehicle command to carry out the motion in the same time frame (452, 454), serves as strong evidence that the pilot of the vehicle is known (and is cooperating).

The relationship between these identifiers, the techniques for applying them and the flow of information and signals underlying the aforementioned identifications is shown in FIG. 13.

Figure 14:
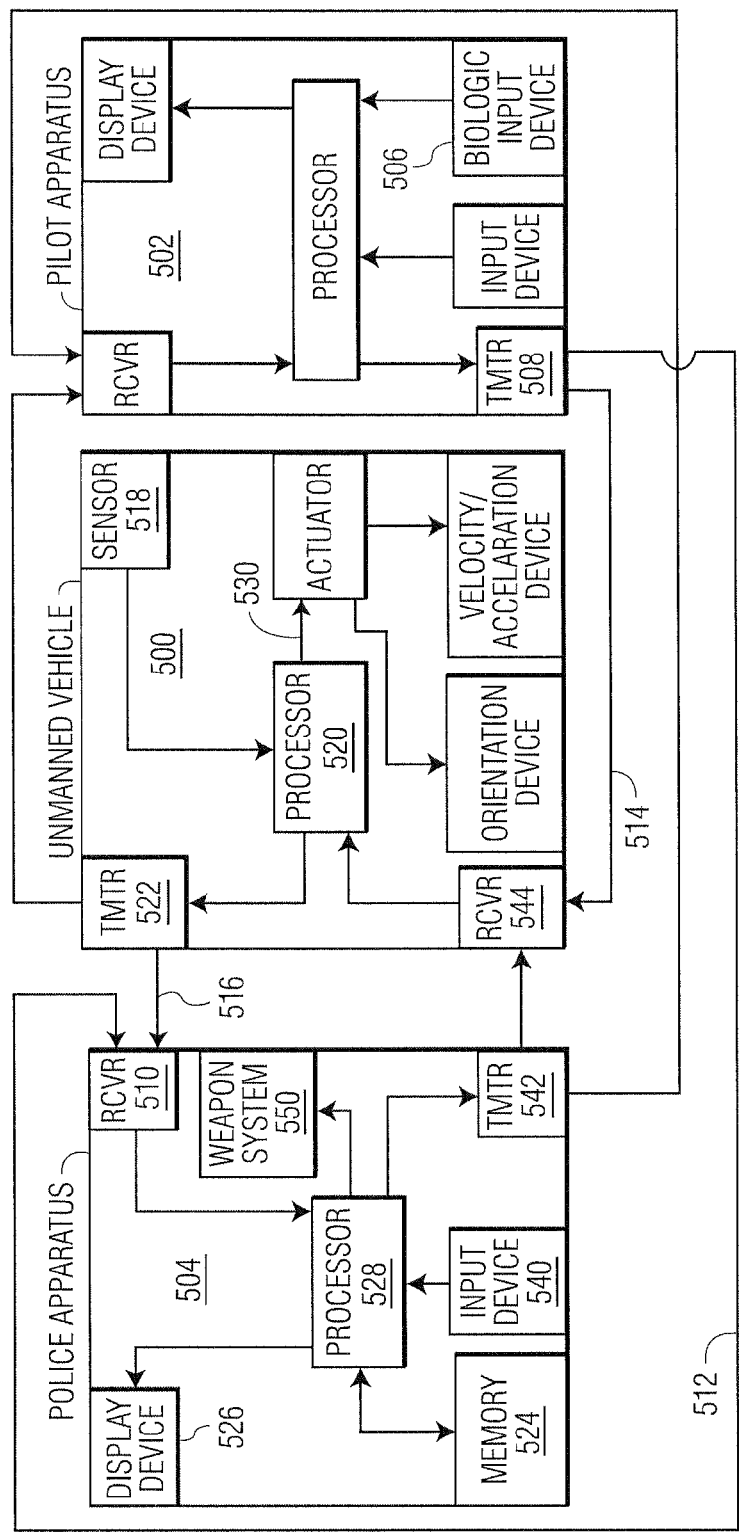
FIG. 14 shows a block diagram of another unmanned vehicle system in which a police unit may obtain information from either the vehicle or the pilot.
Figure 15A:
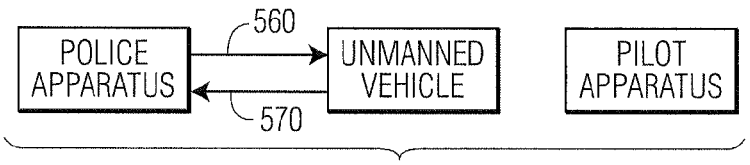
FIGS. 15A to 15E shows five different approaches to police gathering of information, in an unmanned vehicle system.
Figure 15B:
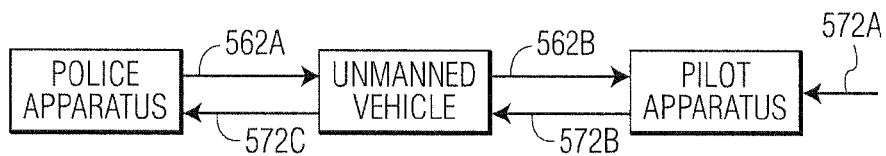
Figure 15C:
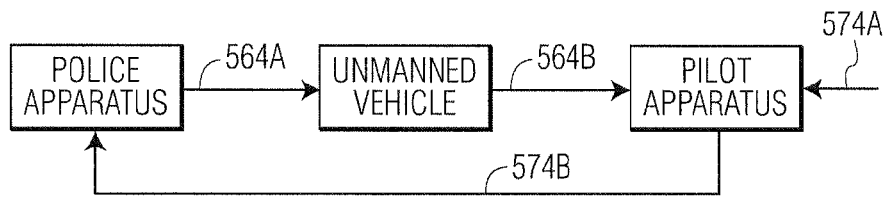
Figure 15D:
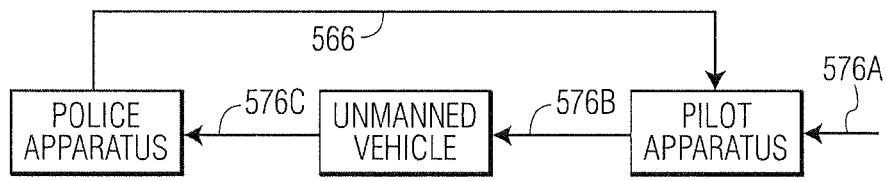
Figure 15E:
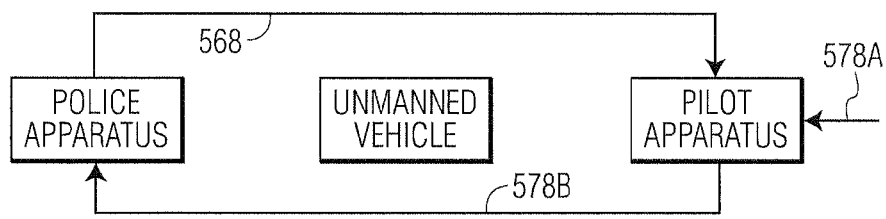

FIG. 14 shows apparatus which utilizes the aforementioned relationships for policing UV 500. The UV is controlled by a pilot utilizing pilot apparatus 502. The police apparatus 504 may obtain information from either UV 500 or 502.

For example, if the police wish to obtain biologic information showing a pilot's face, the pilot's hand inputting vehicle controls, and contiguous body parts in the same image as the hand and face, video camera information would be inputted to 506 and transmitted by 508. It could be transmitted directly to receiver 510 by signal 512, or via the UV, by signals and 516. The information would be supplemented by imaging—within the same image as face, hand and contiguous body parts—the input device, preferably with enough detail to allow a police person to determine the command that was inputted. This may be supplemented by also showing the pilot display device in the same image.

The incoming biologic information at 504 is compared to that stored in a database 524. The results of the comparison may be displayed as side by side images by 526. Alternatively, processor 528 may analyze the extent of a match and display information showing such analysis on 526. It may also show alternative choices for a match to the image.

If the police wish to have confirmatory information that the pilot's command was inputted to the UV under observation, then simultaneous police observation of the UV sensor output (by the signal path 518 to 520 to 522 to 510) and of a biologically identified pilot inputting this command, as per 454 of FIG. 13 (and the method of aforementioned U.S. Pat. No. 8,233,672), would allow for this. Another approach to confirmation would be to transmit a copy of the actuator inputs 530 for the UV. The signal path to the police unit would be 520 to 522 to 510.

Any two or more of the following types of identification data may be compared:
a) alphanumeric data pertaining to the pilot 450;
b) biologic identification data pertaining to the pilot 452;
c) biologic data pertaining to known registered pilots 524;

d) video information showing the pilot inputting a command to control the UV 454;
e) audio information containing voiced pilot commands, and analyzed for voiceprint data 452;
f) UV motion (i.e. following either a spontaneously inputted or a requested command 462, 464);
g) external observation 458 of the UV following either a spontaneously inputted command 456 or a requested command (as discussed hereinabove), and
h) decoded output signals 466, 530 from the UV processor intended for a UV actuator.

FIG. 15 shows a variety of possible information routes for police (POL) request of information, and for supplying the information to the police.

Referring again to FIG. 14, in the event that the police determine that the UV pilot is acting inappropriately, or is a rogue pilot, or that the UV is malfunctioning, all of the options for neutralizing the situation discussed hereinabove are available. In embodiments of the invention where the police may take control of the UV, a signal would be sent 540 to 528 to 542 to 544 to 520 to accomplish this in suitably equipped UVs. Telemetry for continuing to control the UV could be supplied by 518 to 520 to 522 to 510 to 528 to 526. If deemed appropriate a weapon system 550 aboard a police vehicle could be activated by 540 to 528 to 550, to incapacitate the UV.

There has thus been shown and described a novel method and apparatus for managing unauthorized use of an unmanned aircraft which fulfills all the objects and advantages sought therefor. Many changes, modifications, variations and other uses and applications of the subject invention will, however, become apparent to those skilled in the art after considering this specification and the accompanying drawings which disclose the preferred embodiments thereof. All such changes, modifications, variations and other uses and applications which do not depart from the spirit and scope of the invention are deemed to be covered by the invention, which is to be limited only by the claims which follow.

What is claimed is:

1. An unmanned vehicle system, which is remotely controllable from a control source with police apparatus located remotely from each of said vehicle and said control source, comprising:

(A) a remotely controlled vehicle comprising:
(1) a vehicle receiving device, for receiving instruction signals from each of said control source and said police apparatus;
(2) a vehicle processor, coupled to said vehicle receiving device, for receiving instructions specified by said instruction signals, and producing operational control signals for the vehicle in response to said instructions;
(3) at least one actuator, coupled to said processor, responsive to said operational control signals, for actuating at least one of:
(i) at least one device for controlling an orientation of said vehicle, and
(ii) at least one device for controlling at least one of (i) a velocity, and (ii) an acceleration, of said vehicle;
(4) at least one sensing device, coupled to said vehicle processor, for sensing vehicle data and supplying sensed vehicle data signals to said vehicle processor representing said sensed vehicle data; and
(5) a vehicle transmitting device, coupled to said vehicle processor, for transmitting said signals representing said sensed vehicle data;

(B) a remote control unit for providing at least one biologic identifier signal and said instruction signals, said remote control unit comprising:
(1) a remote control transmitting device, for transmitting said instruction signals and said at least one biologic identifier signal;
(2) a remote control receiving device for receiving said sensed vehicle data signals;
(3) a first remote control input device for manually inputting instructions;
(4) a second remote control input device for inputting biologic identification information pertaining to a pilot using the remote control unit;
(5) a display device for displaying information; and
(6) a remote control processor, coupled to each of said remote control transmitting device, said remote control receiving device, said first remote control input device, said second remote control input device and said display device, for
(i) generating instruction signals representing said inputted instructions and generating said at least one biologic identifier signal representing said inputted biologic identification information and causing said remote control transmitting device to transmit said signals to said vehicle receiving device, and
(ii) processing signals representing said sensed vehicle data received by said remote control receiving device and supplying said signals to said remote control display device;

(C) a police unit for communicating with said unmanned vehicle comprising:
(1) a police transmitting device, for transmitting an interrogation signal to said vehicle receiving device;
(2) a police receiving device, for receiving said at least one biologic identifier signal from said vehicle transmitting device;
(3) a memory device, for storing and providing certified biologic identification information and respective alphanumeric identification information pertaining to each of a plurality of persons; and
(4) a police processor, coupled to each of said police transmitting device, said police receiving device, and said memory device, for
(i) storing said certified biologic and said respective alphanumeric identification information in said memory and retrieving it therefrom,
(ii) generating an interrogation signal for transmission to said vehicle receiving device,
(iii) receiving said biologic identification information from said police receiving device, and comparing it to said stored certified biologic identification information, and
(iv) indicating a match between said stored certified biologic identification information and said received biologic identification information;

wherein
(I) said vehicle processor is further operative to supply said signals representing said sensed vehicle data to said vehicle transmitting device, and to cause said transmitting device to transmit said signals to said remote control receiving device;
(II) said remote control unit display device is operative to display a representation of said sensed vehicle data;
(III) said vehicle receiving device is operative to receive said interrogation signal from said police transmitting device;

(IV) in response to said received interrogation signal, said vehicle processor is operative to cause said vehicle transmitting device to relay said interrogation signal to said remote control receiving device;

(V) in response to said received interrogation signal, said remote control processor is operative to cause said remote control transmitting device to transmit said at least one biologic identifier signal to said vehicle receiving device;

(VI) said vehicle processor is further operative to relay said received biologic identification information to said police receiving device, for comparison to said stored certified biologic information;

whereby (a) the motion of said unmanned vehicle is controlled by said pilot by inputting instructions to said vehicle input device, in response to a representation of vehicle data displayed by said display device;

(b) said interrogation signal is transmitted from said police unit to said vehicle and thence to said remote control unit, and in response thereto, said biologic identification information is transmitted from said remote control unit to said vehicle and thence to said police unit;

thereby to allow said police unit to determine the identity of the person controlling an unmanned vehicle.

2. The system defined in claim 1, wherein said unmanned vehicle is selected from the group consisting of:
(A) an unmanned aerial vehicle,
(B) an unmanned ground vehicle,
(C) an unmanned underwater vehicle, and
(D) an unmanned space vehicle.

3. The system defined in claim 1, wherein said biologic identification information is selected from the group consisting of:
(A) an image of a face;
(B) an image of a retina;
(C) an image of an iris of an eye;
(D) at least one fingerprint;
(E) at least one palm print;
(F) a voiceprint; and
(G) a DNA sample.

4. The system defined in claim 1, wherein said second input device comprises at least one of:
(A) at least one video camera; and
(B) a microphone.

5. The system defined in claim 1, wherein said police unit further comprises a police display device, coupled to said police processor.

6. The system defined in claim 5, wherein said police display device is operative to display at least one of:
(A) said certified biologic identification information;
(B) said received biologic identification information;
(C) a comparison of (i) said certified biologic identification information, and (ii) said received biologic identification information; and
(D) said indication of a match between (i) said certified biologic identification information, and (ii) said received biologic identification information; or the absence thereof.

7. The system defined in claim 1, wherein said police processor is operative to cause said police transmitting device to transmit a violation signal in response to at least one of:
(1) an absence of the receipt of said biologic information, following the transmission of an interrogation signal, and
(2) an absence of a match between said certified biologic identification information and said received biologic information.

8. The system defined in claim 1, wherein said police processor is operative to cause said police transmitting device to transmit at least one high output signal for interfering with at least one of
(A) said remote control receiving device, and
(B) said vehicle receiving device, in response to at least one of:
(1) an absence of the receipt of said biologic information, following the transmission of an interrogation signal, and
(2) an absence of a match between said certified biologic identification information and said received biologic information.

9. The system defined in claim 1, wherein
(A) said police unit further comprises a projectile-generating weapon for destroying said unmanned vehicle, having an input for inputting an activation signal, coupled to said police processor;
(B) said weapon launches said projectile in response to an inputted activation signal; and
(C) said processor is operative to generate said activation signal in response to at least one of:
(1) an absence of the receipt of said biologic information, following the transmission of an interrogation signal, and
(2) an absence of a match between said certified biologic identification information and said received biologic information.

10. The system defined in claim 1, wherein said police unit further comprises an input device, coupled to said police processor, and wherein an inputted interrogation request causes said processor to generate a respective interrogation signal.

11. The system defined in claim 1, wherein said police transmitting device is further operative to transmit said interrogation signal directly to said control unit receiving device, and wherein said control unit receiving device is further operative to receive said interrogation signal directly from said police unit transmitting device.

12. The system defined in claim 1, wherein said control unit display device is further operative to display a representation of said interrogation signal.

13. The system defined in claim 1, wherein said remote control transmitting device is further operative to transmit said at least one biologic identifier signal directly to said police receiving device, and wherein said receiving device is operative to receive said identifier signal directly from said remote control transmitting device.

14. The system defined in claim 1, wherein said second input device is a video camera for generating signals representing a plurality of images, each such image showing each of:
(i) the hand of said pilot providing an inputted instruction to said first remote control input device,
(ii) at least one body part of the pilot selected from the group consisting of: a face, a retina, an iris, a fingerprint and a palm print, and
(iii) the contiguous body parts of the pilot situated between said hand and said biologic identifier;

whereby said images allow for the identification of the person inputting said instructions.

15. The system defined in claim 14, wherein said images also show at least one of:
(A) the display device of said remote control unit, and
(B) the first remote control input device;
thereby to allow for the determination that said pilot inputted a specific instruction.

16. The system defined in claim 15, wherein
(A) said police processor is further operative to cause said police transmitting device to transmit a second interrogation signal, requesting the transmission of said instruction signals from said unmanned vehicle;
(B) said vehicle receiving device is further operative to receive said second interrogation signal, for input to said vehicle processor;
(C) said vehicle processor is further operative to cause said vehicle transmitting device to transmit said received instructions to said police receiving device, in response to the receipt of said second interrogation signal from said police transmitting device;
(D) said police processor is further operative analyze said received instruction signals, to determine the respective instructions represented by said instruction signals;
(E) said police unit further comprises a police display device, coupled to said police processor, for display of
  (i) a representation of said respective instructions, and
  (ii) said images inputted by said video camera;
whereby
  a police person, observing said police display device, determines whether the person inputting said instructions is the source of instructions received by said unmanned vehicle.

17. The system defined in claim 15, wherein
(A) said police processor is further operative to cause said police transmitting device to transmit a third interrogation signal, requesting the transmission of said instruction signals from said unmanned vehicle to said police unit;
(B) each of said vehicle receiving device, said vehicle processor, said vehicle transmitting device and said remote control receiving device is, sequentially, operative to relay said third interrogation signal to said remote control processor, and said processor is operative to cause said display device to display a representation of said request to said pilot;
(C) said first remote control input device is operative to input a forward instruction indirectly command to said remote control processor and said processor is operative to cause said remote control transmitting device to transmit a forward instruction signal to said vehicle receiving device;
(D) said vehicle processor is further operative to cause said vehicle transmitting device to transmit said received instructions to said police receiving device, in response to the receipt of said forward instruction signal from said remote control unit processor;
(E) said police processor is further operative analyze received instruction signals, to determine the respective instructions represented by said instruction signals;
(F) said police unit further comprises a police display device, coupled to said police processor, for display of
  (i) a representation of said respective instructions, and
  (ii) said images inputted by said video camera;
whereby
  a police person, observing said police display device, determines whether the person inputting said instructions is the source of instructions received by said unmanned vehicle.

18. The system defined in claim 15, wherein
(A) said police processor is further operative to cause said police transmitting device to transmit a fourth interrogation signal, requesting the transmission of said instruction signals directly from said remote control unit to said police receiving device;
(B) each of said vehicle receiving device, said vehicle processor, said vehicle transmitting device and said remote control receiving device is, sequentially, operative to relay said fourth interrogation signal to said remote control processor, and said processor is operative to cause said display device to display a representation of said request to said pilot;
(C) said first remote control input device is operative to input a forward instruction directly command to said remote control processor and said processor is operative to cause said remote control transmitting device to additionally transmit said instructions to said police receiving device;
(D) said police processor is further operative analyze said received instruction signals, to determine the respective instructions represented by said instruction signals;
(E) said police unit further comprises a police display device, coupled to said police processor, for display of
  (i) a representation of said respective instructions transmitted by said remote control transmitting device, and
  (ii) said images inputted by said video camera;
whereby
  a police person, observing said police display device, determines whether the person inputting said instructions is the source of instructions received by said unmanned vehicle.

19. The system defined in claim 15, wherein
(A) said police processor is further operative to cause said police transmitting device to transmit a fifth interrogation signal directly to said remote control unit receiving device, requesting the transmission of said instruction signals from said unmanned vehicle to said police unit;
(B) said remote control receiving device is operative to receive said fifth interrogation signal, and said remote control processor is operative to cause said display device to display a representation of said request to said pilot;
(C) said first remote control input device is operative to input a forward instruction indirectly command to said remote control processor and said processor is operative to cause said remote control transmitting device to transmit a forward instruction signal to said vehicle receiving device;
(D) said vehicle processor is further operative to cause said vehicle transmitting device to transmit said received instructions to said police receiving device, in response to the receipt of said forward instruction signal from said remote control unit processor;
(E) said police processor is further operative analyze said received instruction signals, to determine the respective instructions represented by said instruction signals;
(F) said police unit further comprises a police display device, coupled to said police processor, for display of
  (i) a representation of said respective instructions, and
  (ii) said images inputted by said video camera;
whereby
  a police person, observing said police display device, determines whether the person inputting said instructions is the source of instructions received by said unmanned vehicle.

20. The system defined in claim 15, wherein
(A) said police processor is further operative to cause said police transmitting device to transmit a sixth interrogation signal directly to said remote control unit receiving device, requesting the transmission of said instruction signals directly from said remote control unit to said police receiving device;
(B) said remote control receiving device is operative to receive said sixth interrogation signal, and said remote control processor is operative to cause said display device to display a representation of said request to said pilot;
(C) said first remote control input device is operative to input a forward instruction directly command to said remote control processor and said processor is operative to cause said remote control transmitting device to additionally transmit said instructions to said police receiving device;
(D) said police processor is further operative analyze said received instruction signals, to determine the respective instructions represented by said instruction signals;
(E) said police unit further comprises a police display device, coupled to said police processor, for display of
  (i) a representation of said respective instructions transmitted by said remote control transmitting device, and
  (ii) said images inputted by said video camera;
whereby
  a police person, observing said police display device, determines whether the person inputting said instructions is the source of instructions received by said unmanned vehicle.

21. The system defined in claim 1, wherein said at least one sensing device comprises at least one apparatus for determining:
  (A) an altitude,
  (B) a latitude,
  (C) a longitude,
  (D) GPS coordinates,
  (E) a velocity,
  (F) a rate of climb,
  (G) a rate of descent,
  (H) a horizontal acceleration,
  (I) a vertical acceleration,
  (J) an attitude,
  (K) a pitch,
  (L) a yaw,
  (M) a rate of roll,
  (N) a rate of change of pitch, and
  (O) a rate of change of yaw.

22. The system defined in claim 15, wherein
(A) said police processor is further operative to cause said police transmitting device to transmit a seventh interrogation signal, requesting the transmission of said sensed vehicle data signals from said unmanned vehicle;
(B) said vehicle receiving device is further operative to receive said seventh interrogation signal, for input to said vehicle processor;
(C) said vehicle processor is further operative to cause said vehicle transmitting device to transmit said sensed vehicle data signals to said police receiving device, in response to the receipt of said seventh interrogation signal from said police transmitting device;
(D) said police processor is further operative analyze said received sensed vehicle data signals, to determine at least one of (a) said sensed vehicle data, and (b) a respective vehicle motion;
(E) said police unit further comprises a police display device, coupled to said police processor, for display of
  (i) a representation of at least one of (a) said sensed vehicle data, and (b) said respective vehicle motion, and
  (ii) said images inputted by said video camera;
whereby
  a police person, observing said police display device, determines whether the person inputting said instructions is the source of instructions causing the observed vehicle motion.

23. The system defined in claim 15, wherein
(A) said police processor is further operative to cause said police transmitting device to transmit an eighth interrogation signal, requesting the transmission of said sensed vehicle data signals from said unmanned vehicle to said police unit;
(B) each of said vehicle receiving device, said vehicle processor, said vehicle transmitting device and said remote control receiving device is, sequentially, operative to relay said eighth interrogation signal to said remote control processor, and said processor is operative to cause said display device to display a representation of said request to said pilot;
(C) said first remote control input device is operative to input a forward sensed vehicle data indirectly command to said remote control processor and said processor is operative to cause said remote control transmitting device to transmit a forward sensed vehicle data signal to said vehicle receiving device;
(D) said vehicle processor is further operative to cause said vehicle transmitting device to transmit said sensed vehicle data signals to said police receiving device, in response to the receipt of said forward sensed vehicle data signal from said remote control unit processor;
(E) said police processor is further operative analyze said received sensed vehicle data signals, to determine at least one of (a) said sensed vehicle data, and (b) a respective vehicle motion;
(F) said police unit further comprises a police display device, coupled to said police processor, for display of
  (i) a representation of at least one of (a) said sensed vehicle data, and (b) said respective vehicle motion, and
  (ii) said images inputted by said video camera;
whereby
  a police person, observing said police display device, determines whether the person inputting said instructions is the source of instructions causing the observed vehicle motion.

24. The system defined in claim 15, wherein
(A) said police processor is further operative to cause said police transmitting device to transmit a ninth interrogation signal, requesting the transmission of said sensed vehicle data signals directly from said remote control unit to said police receiving device;
(B) each of said vehicle receiving device, said vehicle processor, said vehicle transmitting device and said remote control receiving device is, sequentially, operative to relay said ninth interrogation signal to said remote control processor, and said processor is operative to cause said display device to display a representation of said request to said pilot;
(C) said first remote control input device is operative to input a forward sensed vehicle data directly command to said remote control processor and said processor is operative to cause said remote control transmitting device to transmit said sensed vehicle data signals to said police receiving device;

(D) said police processor is further operative analyze said received sensed vehicle data signals, to determine at least one of (a) said sensed vehicle data, and (b) a respective vehicle motion;

(E) said police unit further comprises a police display device, coupled to said police processor, for display of
   (i) a representation of at least one of (a) said sensed vehicle data, and (b) said respective vehicle motion, and
   (ii) said images inputted by said video camera;

whereby
a police person, observing said police display device, determines whether the person inputting said instructions is the source of instructions causing the observed vehicle motion.

25. The system defined in claim 15, wherein
(A) said police processor is further operative to cause said police transmitting device to transmit a tenth interrogation signal directly to said remote control unit receiving device, requesting the transmission of said sensed vehicle data signals from said unmanned vehicle to said police unit;

(B) said remote control receiving device is operative to receive said tenth interrogation signal, and said remote control processor is operative to cause said display device to display a representation of said request to said pilot;

(C) said first remote control input device is operative to input a forward sensed vehicle data indirectly command to said remote control processor and said processor is operative to cause said remote control transmitting device to transmit a forward sensed vehicle data signal to said vehicle receiving device;

(D) said vehicle processor is further operative to cause said vehicle transmitting device to transmit said sensed vehicle data signals to said police receiving device, in response to the receipt of said forward sensed vehicle data signal from said remote control unit processor;

(E) said police processor is further operative analyze said received sensed vehicle data signals, to determine at least one of (a) said sensed vehicle data, and (b) a respective vehicle motion;

(F) said police unit further comprises a police display device, coupled to said police processor, for display of
   (i) a representation of at least one of (a) said sensed vehicle data, and (b) said respective vehicle motion, and
   (ii) said images inputted by said video camera;

whereby
a police person, observing said police display device, determines whether the person inputting said instructions is the source of instructions causing the observed vehicle motion.

26. The system defined in claim 15, wherein
(A) said police processor is further operative to cause said police transmitting device to transmit an eleventh interrogation signal directly to said remote control unit receiving device, requesting the transmission of said sensed vehicle data signals directly from said remote control unit to said police receiving device;

(B) said remote control receiving device is operative to receive said eleventh interrogation signal, and said remote control processor is operative to cause said display device to display a representation of said request to said pilot;

(C) said first remote control input device is operative to input a forward sensed vehicle data signals directly command to said remote control processor and said processor is operative to cause said remote control transmitting device to transmit said sensed vehicle data signals to said police receiving device;

(D) said police processor is further operative analyze said received sensed vehicle data signals, to determine at least one of (a) said sensed vehicle data, and (b) a respective vehicle motion;

(E) said police unit further comprises a police display device, coupled to said police processor, for display of
   (i) a representation of at least one of (a) said sensed vehicle data, and (b) said respective vehicle motion, and
   (ii) said images inputted by said video camera;

whereby
a police person, observing said police display device, determines whether the person inputting said instructions is the source of instructions causing the observed vehicle motion.

27. The system defined in claim 1, wherein
(A) said police processor is further operative to generate a maneuver signal requesting said pilot to input a police-specified instruction for said unmanned vehicle to execute a police-specified maneuver;

(B) said police processor is further operative to cause said police transmitting device to transmit said maneuver signal to said remote control receiving device; and (C) said remote control processor is further operative to cause said display device to display a representation of said maneuver signal for said pilot.

28. The system defined in claim 27, wherein said maneuver signal is transmitted from said police transmitting device to said vehicle receiving device; and thence sequentially to each of: said vehicle processor, said vehicle transmitting device and said remote control receiving device.

29. The system defined in claim 27, wherein said maneuver signal is transmitted from said police transmitting device directly to said remote control receiving device without transmission to said vehicle receiving device.

30. The system defined in claim 27, wherein said police specified maneuver is selected from the group:
(A) a roll,
(B) a bank,
(C) a turn,
(D) a descent,
(E) an ascent,
(F) an acceleration,
(G) a deceleration, and
(H) an emission of a light signal.

31. The system defined in claim 27, wherein
(A) said police processor is further operative to cause said police transmitting device to transmit a twelfth interrogation signal, requesting the transmission of said sensed vehicle data signals from said unmanned vehicle;

(B) said vehicle receiving device is further operative to receive said twelfth interrogation signal, for input to said vehicle processor;

(C) said vehicle processor is further operative to cause said vehicle transmitting device to transmit said sensed vehicle data signals to said police receiving device, in response to the receipt of said twelfth interrogation signal from said police transmitting device;

(D) said police processor is further operative to analyze said received sensed vehicle data signals, to determine at least one of (a) said sensed vehicle data, and (b) a respective vehicle motion, following the transmission of said maneuver signal;
(E) said police unit further comprises a police display device, coupled to said police processor, for display of
(i) a representation of at least one of (a) said sensed vehicle data, and (b) said respective vehicle motion following the transmission of said maneuver signal, and
(ii) a representation of the police-specified maneuver requested by said maneuver signal;
whereby
a police person, observing said police display device, determines whether an identified pilot is the person controlling said unmanned vehicle.

32. The system defined in claim 27, wherein
(A) said police processor is further operative to cause said police transmitting device to transmit a thirteenth interrogation signal, requesting the transmission of said sensed vehicle data signals from said unmanned vehicle;
(B) said vehicle receiving device is further operative to receive said thirteenth interrogation signal, for input to said vehicle processor;
(C) said vehicle processor is further operative to cause said vehicle transmitting device to transmit said sensed vehicle data signals to said police receiving device, in response to the receipt of said thirteenth interrogation signal from said police transmitting device;
(D) said police processor is further operative to analyze said received sensed vehicle data signals, to determine at least one of (a) said sensed vehicle data, and (b) a respective vehicle motion, following the transmission of said maneuver signal;
(E) said police processor is further operative to compare
(i) at least one of (a) said sensed vehicle data, and (b) said respective vehicle motion following the transmission of said maneuver signal, and
(ii) a motion consistent with the police-specified maneuver requested by said maneuver signal;
(F) said police processor is further operative to provide a first comparison signal indicating the result of said comparison;
whereby
said police processor provides information concerning whether an identified pilot is the person controlling said unmanned vehicle.

33. The system defined in claim 27, wherein
(A) said police processor is further operative to cause said police transmitting device to transmit a fourteenth interrogation signal, requesting the transmission of said sensed vehicle data signals to said police receiving device;
(B) said remote control receiving device is further operative to receive said fourteenth interrogation signal, and said remote control processor is operative to cause said display device to display a representation of said request to said pilot;
(C) said first remote control input device is operative to input a forward sensed vehicle data signals command to said remote control processor and said processor is operative to cause the transmission of said sensed vehicle data signals to said police receiving device;
(D) said police processor is further operative to analyze said received sensed vehicle data signals, to determine at least one of (a) said sensed vehicle data, and (b) a respective vehicle motion, following the transmission of said maneuver signal;
(E) said police unit further comprises a police display device, coupled to said police processor, for display of
(i) a representation of at least one of (a) said sensed vehicle data, and (b) said respective vehicle motion following the transmission of said maneuver signal, and
(ii) a representation of the police-specified maneuver requested by said maneuver signal;
whereby
a police person, observing said police display device, determines whether an identified pilot is the person controlling said unmanned vehicle.

34. The system defined in claim 33, wherein
(A) the route of said fourteenth interrogation signal is selected from the group comprising:
(i) directly from police unit to remote control unit, and
(ii) from police unit to unmanned vehicle and thence to remote control unit; and
(B) the source of said sensed vehicle data signals is selected from the group comprising:
(i) said vehicle, following the receipt of a transfer command from said remote control unit, and
(ii) said remote control unit.

35. The system defined in claim 27, wherein
(A) said police processor is further operative to cause said police transmitting device to transmit a fifteenth interrogation signal, requesting the transmission of said sensed vehicle data signals to said police receiving device;
(B) said remote control receiving device is further operative to receive said fifteenth interrogation signal, and said remote control processor is operative to cause said display device to display a representation of said request to said pilot;
(C) said first remote control input device is operative to input a forward sensed vehicle data signals command to said remote control processor and said processor is operative to cause the transmission of said sensed vehicle data signals to said police receiving device;
(D) said police processor is further operative to analyze said received sensed vehicle data signals, to determine at least one of (a) said sensed vehicle data, and (b) a respective vehicle motion, following the transmission of said maneuver signal;
(E) said police processor is further operative to compare
(i) at least one of (a) said sensed vehicle data, and (b) said respective vehicle motion following the transmission of said maneuver signal, and
(ii) a motion consistent with the police-specified maneuver requested by said maneuver signal;
(F) said police processor is further operative to provide a second comparison signal indicating the result of said comparison;
whereby
said police processor provides information concerning whether an identified pilot is the person controlling said unmanned vehicle.

36. The system defined in claim 35, wherein
(A) the route of said fifteenth interrogation signal is selected from the group comprising:
(i) directly from police unit to remote control unit, and
(ii) from police unit to unmanned vehicle and thence to remote control unit; and (B) the source of said sensed vehicle data signals is selected from the group comprising:
  (i) said vehicle, following the receipt of a transfer command from said remote control unit, and
  (ii) said remote control unit.

37. The system defined in claim 27, wherein
(A) said police processor is further operative to cause said police transmitting device to transmit a sixteenth interrogation signal, requesting the transmission of said instruction signals from said unmanned vehicle;
(B) said vehicle receiving device is further operative to receive said sixteenth interrogation signal, for input to said vehicle processor;
(C) said vehicle processor is further operative to cause said vehicle transmitting device to transmit said instruction signals to said police receiving device, in response to the receipt of said sixteenth interrogation signal from said police transmitting device;
(D) said police processor is further operative to analyze said received instruction signals, to determine the respective instructions represented by said instruction signals, following the transmission of said maneuver signal;
(E) said police unit further comprises a police display device, coupled to said police processor, for display of
  (i) a representation of said respective instructions, following the transmission of said maneuver signal, and
  (ii) a representation of the police-specified maneuver requested by said maneuver signal;
whereby
a police person, observing said police display device, determines whether an identified pilot is the person controlling said unmanned vehicle.

38. The system defined in claim 27, wherein
(A) said police processor is further operative to cause said police transmitting device to transmit a seventeenth interrogation signal, requesting the transmission of said instruction signals from said unmanned vehicle;
(B) said vehicle receiving device is further operative to receive said seventeenth interrogation signal, for input to said vehicle processor;
(C) said vehicle processor is further operative to cause said vehicle transmitting device to transmit said instruction signals to said police receiving device, in response to the receipt of said seventeenth interrogation signal from said police transmitting device;
(D) said police processor is further operative to analyze said received instruction signals, to determine the respective instructions represented by said instruction signals, following the transmission of said maneuver signal;
(E) said police processor is further operative to compare
  (i) said respective instructions, following the transmission of said maneuver signal, and
  (ii) a motion consistent with the police-specified maneuver requested by said maneuver signal;
(F) said police processor is further operative to provide a third comparison signal indicating the result of said comparison;
whereby
said police processor provides information concerning whether an identified pilot is the person controlling said unmanned vehicle.

39. The system defined in claim 27, wherein
(A) said police processor is further operative to cause said police transmitting device to transmit an eighteenth interrogation signal, requesting the transmission of said instruction signals to said police receiving device;
(B) said remote control receiving device is further operative to receive said eighteenth interrogation signal, and said remote control processor is operative to cause said display device to display a representation of said request to said pilot;
(C) said first remote control input device is operative to input a forward instruction signals command to said remote control processor and said processor is operative to cause the transmission of said instruction signals to said police receiving device;
(D) said police processor is further operative to analyze said received instruction signals, to determine the respective instructions represented by said instruction signals, following the transmission of said maneuver signal;
(E) said police unit further comprises a police display device, coupled to said police processor, for display of
  (i) said respective instructions, following the transmission of said maneuver signal, and
  (ii) a representation of the police-specified maneuver requested by said maneuver signal;
whereby
a police person, observing said police display device, determines whether an identified pilot is the person controlling said unmanned vehicle.

40. The system defined in claim 39, wherein
(A) the route of said eighteenth interrogation signal is selected from the group comprising:
  (i) directly from police unit to remote control unit, and
  (ii) from police unit to unmanned vehicle and thence to remote control unit; and
(B) the source of said instruction signals is selected from the group comprising:
  (i) said vehicle, following the receipt of a transfer command from said remote control unit, and
  (ii) said remote control unit.

41. The system defined in claim 27, wherein
(A) said police processor is further operative to cause said police transmitting device to transmit a nineteenth interrogation signal, requesting the transmission of said instruction data signals to said police receiving device;
(B) said remote control receiving device is further operative to receive said nineteenth interrogation signal, and said remote control processor is operative to cause said display device to display a representation of said request to said pilot;
(C) said first remote control input device is operative to input a forward instruction signals command to said remote control processor and said processor is operative to cause the transmission of said instruction signals to said police receiving device;
(D) said police processor is further operative to analyze said received instruction signals, to determine the respective instructions represented by said instruction signals, following the transmission of said maneuver signal;
(E) said police processor is further operative to compare
  (i) said respective instructions, following the transmission of said maneuver signal, and
  (ii) a motion consistent with the police-specified maneuver requested by said maneuver signal;
(F) said police processor is further operative to provide a fourth comparison signal indicating the result of said comparison;

whereby
  said police processor provides information concerning whether an identified pilot is the person controlling said unmanned vehicle.

42. The system defined in claim 41, wherein
  (A) the route of said nineteenth interrogation signal is selected from the group comprising:
    (i) directly from police unit to remote control unit, and
    (ii) from police unit to unmanned vehicle and thence to remote control unit; and
  (B) the source of said instruction signals is selected from the group comprising:
    (i) said vehicle, following the receipt of a transfer command from said remote control unit, and
    (ii) said remote control unit.

43. The system defined in claim 27, wherein
  (I) said second input device is a video camera for generating signals representing a plurality of images, each such image showing each of:
    (A) the hand of said pilot providing an inputted instruction to said first remote control input device,
    (B) at least one body part of the pilot selected from the group consisting of: a face, a retina, an iris, a fingerprint and a palm print,
    (C) the contiguous body parts of the pilot situated between said hand and said biologic identifier, and
    (D) at least one of:
      (i) the display device of said remote control unit, and
      (ii) the first remote control input device; and
  (II) said police unit further comprises a police display device for displaying:
    (A) each of said hand, said pilot body part with biologic identifier, said contiguous body parts and at least one of (i) said remote control display device and (ii) said first remote control input device; and
    (B) a representation of the police-specified maneuver requested by said maneuver signal;
whereby
  said displayed images allow for the identification of (a) the person inputting the instructions, and (b) the instructions;
thereby
  to allow for the determination that said identified pilot inputted the police-specified instruction.

44. The system defined in claim 1, wherein
  (I) said unmanned vehicle further comprises a vehicle memory device, coupled to said vehicle processor for storing and providing identification information identifying said vehicle;
  (II) the memory device in said police unit is further operative to store and provide identification information pertaining to each of a plurality of registered vehicles;
  (III) said police processor is further operative to store said registered vehicle identification information in said memory device and to retrieve it therefrom;
  (IV) said police processor is further operative to generate a vehicle interrogation signal for transmission to said vehicle receiving device, and to cause said police transmitting device to transmit said signal;
  (V) in response thereto, said vehicle processor is further operative to retrieve said vehicle identification information from said vehicle memory device, and to cause said vehicle transmitting device to transmit a vehicle ID signal representing said information;
  (VI) said police receiving device is further operative to receive said vehicle ID signal:
  (VII) said police processor is further operative to compare
    (A) said registered vehicle identification information stored in the memory device of said police unit, with
    (B) said received vehicle identification information; and
  (VIII) said police processor is further operative to indicate a match between said registered vehicle identification information and said received vehicle identification information.

45. The system defined in claim 44, wherein, in the absence of said match, said police processor is further operative to cause said police transmitting device to transmit at least one of:
  (A) a notification signal; and
  (B) at least one high output signal for interfering with at least one of
    (i) said remote control receiving device, and
    (ii) said vehicle receiving device.

46. The system defined in claim 44, wherein said vehicle memory device is a write-once-only device.

47. The system defined in claim 1, wherein
  (I) said remote control unit further comprises a remote control memory device, coupled to said remote control processor for storing and providing identification information identifying said remote control unit;
  (II) the memory device in said police unit is further operative to store and provide identification information pertaining to each of a plurality of registered remote control units;
  (III) said police processor is further operative to store said registered remote control unit identification information in said memory device and to retrieve it therefrom;
  (IV) said police processor is further operative to generate a remote control interrogation signal for transmission to said remote control receiving device, and to cause said police transmitting device to transmit said signal;
  (V) in response thereto, said remote control processor is further operative to retrieve said remote control identification information from said remote control memory device, and to cause said remote control transmitting device to transmit a remote control ID signal representing said information;
  (VI) said police receiving device is further operative to receive said remote control ID signal:
  (VII) said police processor is further operative to compare
    (A) said registered remote control unit identification information stored in the memory device of said police unit, with
    (B) said received remote control identification information; and
  (VIII) said police processor is further operative to indicate a match between said registered remote control unit identification information and said received remote control identification information.

48. The system defined in claim 47, wherein, in the absence of said match, said police processor is further operative to cause said police transmitting device to transmit at least one of:
  (A) a second notification signal; and
  (B) at least one additional high output signal for interfering with at least one of
    (i) said remote control receiving device, and
    (ii) said vehicle receiving device.

49. The system defined in claim 47, wherein said remote control memory device is a write-once-only device.

50. The system defined in claim 1, wherein said memory device of said police unit is a write-once-only device.

* * * * *